US010300830B2

(12) United States Patent
McIver et al.

(10) Patent No.: US 10,300,830 B2
(45) Date of Patent: May 28, 2019

(54) STORAGE AND BLENDING SYSTEM FOR MULTI-COMPONENT GRANULAR COMPOSITIONS

(71) Applicant: Solaris Oilfield Site Services Operating LLC, Houston, TX (US)

(72) Inventors: Terry McIver, Santa Anna, TX (US); John Cunningham, Early, TX (US); William Vaughn Managan, II, Rochelle, TX (US); Joe Daniel Matkowski, San Angelo, TX (US)

(73) Assignee: Solaris Oilfield Site Services Operating LLC, Houston, TX (US)

( * ) Notice: Subject to any disclaimer, the term of this patent is extended or adjusted under 35 U.S.C. 154(b) by 23 days.

(21) Appl. No.: 15/287,523

(22) Filed: Oct. 6, 2016

(65) Prior Publication Data

US 2017/0021318 A1 Jan. 26, 2017

Related U.S. Application Data

(60) Continuation-in-part of application No. 14/557,832, filed on Dec. 2, 2014, now Pat. No. 9,499,335, which
(Continued)

(51) Int. Cl.
*B60P 1/48* (2006.01)
*B60P 1/64* (2006.01)
(Continued)

(52) U.S. Cl.
CPC ........ *B60P 1/483* (2013.01); *B01F 15/00155* (2013.01); *B01F 15/0479* (2013.01);
(Continued)

(58) Field of Classification Search
CPC ............ B01F 15/00155; B01F 15/0479; B01F 2215/0081; B65G 65/34; B65G 65/42;
(Continued)

(56) References Cited

U.S. PATENT DOCUMENTS 2,606,676 A   8/1952   Dempster
2,642,979 A   6/1953   Beech
(Continued)

FOREIGN PATENT DOCUMENTS

CA   2653370 A1   8/2010
DE   1274989 B    8/1968
(Continued)

OTHER PUBLICATIONS

CIPO Office Action dated Jan. 15, 2018 for co-pending Canadian patent app. No. 2964009.
(Continued)

*Primary Examiner* — Tony G Soohoo
(74) *Attorney, Agent, or Firm* — Elizabeth R. Hall & Associates, P.C; Elizabeth R. Hall

(57) ABSTRACT

Embodiments of the present invention include a method and system for blending multi-component granular compositions such as proppant used in hydraulic fracturing in well drilling. The system includes the control and management of an on-site storage system for each of the components, regulating the delivery of specified quantities of each component to a blender, and coordinating the flow of materials into and out of the blender.

20 Claims, 16 Drawing Sheets

Related U.S. Application Data is a division of application No. 13/658,551, filed on Oct. 23, 2012, now Pat. No. 8,926,252.

(60) Provisional application No. 62/352,037, filed on Jun. 20, 2016, provisional application No. 62/350,262, filed on Jun. 15, 2016, provisional application No. 61/661,044, filed on Jun. 18, 2012, provisional application No. 61/550,776, filed on Oct. 24, 2011.

(51) Int. Cl.
| | |
|---|---|
| B60P 3/00 | (2006.01) |
| B01F 15/00 | (2006.01) |
| B01F 15/04 | (2006.01) |
| B65D 88/30 | (2006.01) |
| B65D 88/32 | (2006.01) |
| B65G 65/34 | (2006.01) |
| B65G 65/42 | (2006.01) |
| G05D 11/13 | (2006.01) |
| E21B 43/267 | (2006.01) |

(52) U.S. Cl.
CPC .......... B60P 1/6418 (2013.01); B60P 1/6427 (2013.01); B60P 3/00 (2013.01); B65D 88/30 (2013.01); B65D 88/32 (2013.01); B65G 65/34 (2013.01); B65G 65/42 (2013.01); G05D 11/132 (2013.01); *B01F 2215/0081* (2013.01); *E21B 43/267* (2013.01)

(58) Field of Classification Search
CPC ....... E21B 43/267; B65D 88/30; B65D 88/32; B60P 1/483; B60P 1/6427; B60P 3/00; B60P 1/6418
See application file for complete search history.

(56) References Cited

U.S. PATENT DOCUMENTS

| | | | |
|---|---|---|---|
| 2,808,164 | A | 10/1957 | Glendinning |
| 3,151,849 | A | 10/1964 | Maxon, Jr. |
| 3,160,289 | A | 12/1964 | Leefer |
| 3,208,616 | A | 9/1965 | Haskins |
| 3,313,435 | A | 4/1967 | Welk |
| 3,314,557 | A | 4/1967 | Sackett, Sr. |
| 3,343,688 | A | 9/1967 | Ross |
| 3,415,498 | A | 12/1968 | Zaccaron |
| 3,448,866 | A | 6/1969 | Perry et al. |
| 3,547,291 | A | 12/1970 | Dempster |
| 3,618,801 | A | 11/1971 | Blanchard |
| 3,622,026 | A | 11/1971 | Tornheim |
| 3,666,129 | A | 5/1972 | Haskins |
| 3,687,319 | A | 8/1972 | Adam et al. |
| 3,848,758 | A | 11/1974 | Carter |
| 3,934,739 | A | 1/1976 | Zumsteg et al. |
| 3,963,149 | A | 6/1976 | Fassauer |
| 3,985,254 | A | 10/1976 | Grandury |
| 4,111,314 | A | 9/1978 | Nelson |
| 4,163,626 | A | 8/1979 | Batterton et al. |
| 4,265,266 | A | 5/1981 | Kierbow |
| 4,337,014 | A | 6/1982 | Farnham |
| 4,392,567 | A | 7/1983 | Glebov |
| 4,453,878 | A | 6/1984 | Paukku |
| 4,465,420 | A | 8/1984 | Dillman |
| 4,561,821 | A | 12/1985 | Dillman |
| 4,621,972 | A | 11/1986 | Grotte |
| 4,626,166 | A | 12/1986 | Jolly |
| 4,634,335 | A | 1/1987 | Van Den Pol |
| 4,643,292 | A | 2/1987 | Whited |
| 4,708,569 | A | 11/1987 | Nijenhuis |
| 4,715,721 | A | 12/1987 | Walker |
| 4,755,097 | A | 7/1988 | Corompt |
| 4,775,275 | A | 10/1988 | Perry |
| 4,810,159 | A | 3/1989 | Stegmuller |
| 4,850,750 | A | 7/1989 | Cogbill |
| 4,855,960 | A | 8/1989 | Janssen et al. |
| 4,944,646 | A | 7/1990 | Edwards et al. |
| 4,963,070 | A | 10/1990 | Detrick |
| 4,986,719 | A | 1/1991 | Galbreath |
| 5,044,861 | A | 9/1991 | Kirchhoff et al. |
| 5,082,416 | A | 1/1992 | Bock |
| 5,102,284 | A | 4/1992 | Raisio |
| 5,108,247 | A | 4/1992 | Vlaanderen |
| 5,163,800 | A | 11/1992 | Raisio |
| 5,281,023 | A | 1/1994 | Cedillo et al. |
| 5,441,340 | A | 8/1995 | Cedillo et al. |
| 5,542,807 | A | 8/1996 | Kruzick |
| 5,609,836 | A * | 3/1997 | McManus ................. B09C 1/06 210/170.01 |
| 5,775,852 | A | 7/1998 | Boutte |
| 5,957,331 | A | 9/1999 | Minor |
| 6,276,516 | B1 | 8/2001 | Bagust |
| 6,474,926 | B2 | 11/2002 | Weiss |
| 6,672,342 | B2 | 1/2004 | Nussbaumer |
| 6,869,261 | B2 | 3/2005 | Burke |
| 7,214,028 | B2 | 5/2007 | Boasso et al. |
| 7,278,816 | B2 | 10/2007 | Marmur et al. |
| 7,341,419 | B1 | 3/2008 | Fink et al. |
| 7,712,632 | B2 | 5/2010 | Schwass |
| 8,142,134 | B2 | 3/2012 | Lavoie et al. |
| 8,319,680 | B2 | 11/2012 | Sai |
| 8,534,452 | B2 | 9/2013 | Furuyama |
| 8,573,917 | B2 | 11/2013 | Renyer |
| 8,585,341 | B1 | 11/2013 | Oren |
| 8,651,792 | B2 | 2/2014 | Friesen |
| 8,944,740 | B2 | 2/2015 | Teichrob |
| 9,038,865 | B2 | 5/2015 | Naizer |
| 9,150,349 | B2 | 10/2015 | Hall |
| 2003/0202869 | A1 | 10/2003 | Posch |
| 2005/0244256 | A1 | 11/2005 | Barry |
| 2005/0260062 | A1 | 11/2005 | Boasso et al. |
| 2007/0207017 | A1 | 9/2007 | Boasso et al. |
| 2008/0210093 | A1* | 9/2008 | Snowdon ............... B65D 88/30 95/284 |
| 2008/0236818 | A1 | 10/2008 | Dykstra |
| 2010/0071284 | A1 | 3/2010 | Hagan et al. |
| 2010/0196130 | A1 | 8/2010 | Lavoie et al. |
| 2012/0024738 | A1 | 2/2012 | Herman et al. |
| 2012/0099954 | A1 | 4/2012 | Teichrob |
| 2012/0145262 | A1* | 6/2012 | Meier .................... B65G 67/24 137/565.17 |
| 2012/0219391 | A1* | 8/2012 | Teichrob ............... B65G 63/008 414/293 |
| 2012/0298478 | A1 | 11/2012 | Friesen |
| 2013/0108402 | A1 | 5/2013 | Herman et al. |
| 2013/0309052 | A1 | 11/2013 | Luharuka |
| 2013/0322995 | A1 | 12/2013 | Lopes |
| 2014/0023465 | A1 | 1/2014 | Oren |
| 2014/0044507 | A1 | 2/2014 | Naizer |
| 2014/0044508 | A1 | 2/2014 | Luharuka |
| 2014/0305769 | A1 | 10/2014 | Eiden, III |
| 2015/0044003 | A1 | 2/2015 | Pham |
| 2015/0044004 | A1 | 2/2015 | Pham |
| 2015/0166260 | A1 | 6/2015 | Pham |
| 2015/0320235 | A1 | 11/2015 | Carlson |
| 2015/0360856 | A1 | 12/2015 | Oren |

FOREIGN PATENT DOCUMENTS

| | | |
|---|---|---|
| DE | 3329412 A1 | 2/1985 |
| DE | 4019618 A1 | 1/1991 |
| DE | 4108162 A1 | 9/1992 |
| DE | 9418225 U1 | 1/1995 |
| DE | 19513864 A1 | 10/1996 |
| EP | 1142755 A2 | 10/2001 |
| FR | 1370103 A1 | 8/1964 |
| FR | 1486478 A | 6/1967 |
| GB | 934113 A | 8/1963 |
| JP | 57164825 A | 10/1982 |
| JP | 61181733 A | 8/1986 |

(56) References Cited

FOREIGN PATENT DOCUMENTS

OTHER PUBLICATIONS

PCT Interational Search Report and Written Opinion dated Mar. 30, 2015 for related PCT app. No. PCT/US2012/061483.

* cited by examiner

FIG. 11

STORAGE AND BLENDING SYSTEM FOR MULTI-COMPONENT GRANULAR COMPOSITIONS

CROSS-REFERENCE TO RELATED APPLICATIONS

The present application claims priority under 35 U.S.C. 119(e) to U.S. Provisional Application 62/350,262 filed Jun. 15, 2016 and to U.S. Provisional Application 62/352,037 filed Jun. 20, 2016. The present application is a continuation-in-part to and claims priority under 35 U.S.C. 120 to U.S. patent application Ser. No. 14/557,832 filed Dec. 2, 2014, which is a divisional of and claims priority under 35 U.S.C. 120 to U.S. patent application Ser. No. 13/658,551 filed Oct. 23, 2012, which claims priority under 35 U.S.C. 119(e) to U.S. Provisional Application 61/550,776, filed Oct. 24, 2011 and U.S. Provisional Application 61/661,044 filed Jun. 18, 2012, each of which are hereby incorporated by reference in their entireties.

BACKGROUND OF THE INVENTION

Field of the Invention

The present invention relates to systems and methods for on-site blending of large quantities of multi-component granular compositions. In particular, the present invention relates to blending and distributing of multi-component granular compositions for use in the oil and natural gas mining and drilling industries at remote locations.

Description of the Related Art

Granular materials, such as sand, are used in bulk quantities in a number of applications. For example, mining companies sometimes make use of a technique termed "hydraulic fracturing" to aid in the extraction of fossil fuels from well sites. Hydraulic fracturing is the propagation of fractures in a rock layer caused by the presence of a pressurized fluid. Hydraulic fractures form naturally, as in the case of veins or dikes, and is one means by which gas and petroleum from source rocks may migrate to reservoir rocks.

In some cases, oil and gas companies may attempt to accelerate this process in order to release petroleum, natural gas, coal seam gas, or other substances for extraction, where the technique is often called "fracking" or "hydrofracking." This type of fracturing is done from a wellbore drilled into reservoir rock formations. The energy from the injection of a highly-pressurized fracking fluid creates new channels in the rock which can increase the extraction rates and ultimate recovery of fossil fuels. When done in already highly-permeable reservoirs such as sandstone-based wells, the technique is known as well stimulation. Operators typically try to maintain fracture width or slow its decline following treatment by introducing a proppant into the injected fluid. A proppant is a material, such as grains of sand, ceramic, or other particulates, that prevents the fractures from closing when the injection is stopped. Consideration of proppant strengths and prevention of proppant failure becomes more important at deeper depths where pressure and stresses on fractures are higher.

Hydraulic fracturing, often performed in remote areas, uses large amounts of granular material that must be shipped into the site. The large amount of granular material required in a fracking operation at a well site requires that these materials be stored close to the well site so that they may be used as needed. Usable storage space at well and drilling sites is frequently very limited due to the terrain at the well sites or other factors related to the inaccessibility of the sites. As a result, storage space for materials necessary for drilling and mining operations is often at a premium. Improving the efficiency and use of storage space at drilling and well sites can have important economic as well as practical benefits for drilling and mining operations.

Typically, tractor trailer rigs are used to transport these materials to well sites. If no or insufficient storage space is available at the well site, it is oftentimes necessary to store the materials in the same tractor trailer rigs that delivered the materials to the well site. This is an inefficient and frequently cost-prohibitive solution to the storage problem because the trailers must be parked until needed. This is costly because the drivers and their trucks are forced to waste valuable time out of service. Thus, the efficient storage of materials at oil and natural gas well sites is a critical factor in the successful implementation of fracking operations.

In addition, to the need for an efficient on-site storage system, there is an existing need for a means to efficiently control the mixing of the stored granular material to produce a prescribed blend of materials to form the desired proppant.

SUMMARY OF THE INVENTION

The present invention relates to a method and system for blending multi-component granular compositions such as proppant used in hydraulic fracturing in well drilling. The system includes the control and management of an on-site storage system for each of the components, the regulation of the delivery of specified quantities of each component to a blender, and the coordination of the flow of materials into and out of the blender.

One embodiment of the present invention is a blending system that has: (a) a blender that blends at least two ingredients into a blend mixture; (b) a plurality of storage containers, wherein at least one storage container contains each ingredient of the blend mixture; (c) a central feeder oriented such that it delivers the ingredients of the blend mixture into the blender; (d) an ingredient feeder designated for each ingredient in the blend mixture, each ingredient feeder oriented to deliver the ingredient exiting from one storage container to the central feeder; (e) a plurality of feeder regulators, wherein a central regulator controls the rate of delivery of the ingredients from the central feeder into the blender and one ingredient regulator for each ingredient feeder that controls the rate of delivery of each ingredient from its ingredient feeder to the central feeder; and (f) a control system configured to dynamically regulate the feeder regulators to match the delivery rate of all of the ingredients into the blender with the exit rate of the blend mixture from the blender.

Another embodiment of the blending system includes: (a) a blender that blends at least two ingredients into a blend mixture; (b) a central feeder oriented such that it delivers the ingredients of the blend mixture into the blender; (c) a plurality of storage containers, wherein at least one storage container contains each ingredient of the blend mixture; (d) a lead ingredient feeder oriented to deliver a major ingredient to the central feeder, wherein the quantity of the major ingredient delivered to the central feeder is greater than any other ingredient of the blend mixture; (e) at least one secondary feeder oriented to deliver at least one minor ingredient to the central feeder, wherein the quantity of each minor ingredient delivered to the central feeder is less than the quantity of the lead ingredient delivered to the central feeder; (d) a plurality of feeder regulators, wherein a central regulator controls the rate of delivery of the ingredients into the blender, a lead regulator controls the rate of delivery of the major ingredient to the central feeder, and one secondary regulator that controls the rate of delivery of each minor ingredient to the central feeder; and (e) a control system configured to dynamically regulates the feeder regulators, wherein the delivery rate of the minor ingredients to central feeder is less than the delivery rate of the major ingredient to the central feeder.

Yet another embodiment of the blending system comprises: a blender that blends at least two ingredients into a blend mixture; (b) a blender level monitor associated that dynamically monitors a level, mass, or amount of blend mixture contained in the blender; (c) a plurality of storage containers, wherein at least one storage container contains each ingredient of the blend mixture; (d) a container level monitor associated with each storage container that dynamically monitors a level, mass, or amount of material contained in the storage container; (e) a central feeder oriented such that it delivers the ingredients of the blend mixture into the blender; (f) a lead ingredient feeder oriented to deliver a major ingredient to the central feeder, wherein the quantity of the major ingredient delivered to the central feeder is greater than any other ingredient of the blend mixture; (g) at least one secondary feeder oriented to deliver at least one minor ingredient to the central feeder, wherein the quantity of each minor ingredient delivered to the central feeder is less than the quantity of the lead ingredient delivered to the central feeder; (h) a plurality of feeder regulators, wherein a central regulator controls the rate of delivery of the ingredients from the central feeder into the blender, a lead regulator controls the rate of delivery of the major ingredient from the lead feeder to the central feeder, and one secondary regulator for each secondary feeder that controls the rate of delivery of each minor ingredient from its associated secondary feeder to the central feeder; and (i) a control system in communication with the blender monitor, the storage container monitors, and the feeder regulators, wherein the control system is configured to match the inflow of ingredients into the blender to the outflow of the blend mixture from the blender.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. The foregoing has outlined rather broadly several aspects of the present invention in order that the detailed description of the invention that follows may be better understood.

BRIEF DESCRIPTION OF THE DRAWINGS

Appended FIGS. 1-14 depict certain non-limiting embodiments of the storage and blending system and related systems. The figures are not intended to limit the scope of the invention but, instead, are intended to provide depictions of specific embodiments, features and non-limiting characteristics of the systems described herein. The accompanying figures further illustrate the present invention. The components of an embodiment shown in the drawings are not necessarily drawn to scale, emphasis instead being placed upon clearly illustrating the principles of the present invention.

FIG. 1 depicts a modular storage and blending system having an arrangement of six silos positioned vertically on two separate base platforms with a central conveyor between the two platforms.

FIG. 2 depicts a silo in a horizontal orientation on a trailer bed positioned on a base platform.

FIG. 3 depicts a silo being raised from a trailer bed.

FIG. 4 depicts a silo in an upright vertical orientation on a base platform.

FIG. 5 depicts a free-standing silo system disengaged from a flipper mechanism and trailer bed.

FIG. 6 depicts a side view of three silos positioned in a vertical orientation on a base platform.

FIG. 7 depicts a modular storage and blending system having twelve silos where two of modular six silo storing and blending systems depicted in FIG. 1 and aligned in close proximity to each other with their central conveyors interlinked.

FIG. 8 is a schematic representation of an embodiment of the storage and blending system.

FIG. 10 is a schematic representation of an embodiment of the storage and blending system for blending two components.

FIG. 11 depicts a screen display related to the storage and blending system represented in FIG. 10.

FIG. 12 is a schematic representation of an embodiment of the storage and blending system for blending seven components.

FIG. 13 is a flowchart illustrating the information flow for the storage and blending system.

FIG. 14 is a flowchart illustrating a process for monitoring the content levels within each silo and the notification system employed when the content level of a silo falls outside of predetermined limits.

DESCRIPTION OF THE PREFERRED EMBODIMENTS

The present invention relates to a method and system for blending multi-component granular compositions such as proppant used in hydraulic fracturing in well drilling. The system includes the control and management of an on-site storage system for each of the components, the regulation of the delivery of specified quantities of each component to a blender, and the coordination of the flow of materials into and out of the blender.

Unless specifically defined herein, all technical and scientific terms used have the same meaning as commonly understood by one of ordinary skill in the art to which this invention belongs. The term "granular material" is used to define a flowable material comprising solid macroscopic particles, such as sand, gravel, or the like. The term "proppant" is used to define a granular material used in drilling, for example by oil and gas industries. Proppant comprises appropriately sized and shaped particles which may be mixed with fracturing fluid for use in a hydraulic fracturing treatment. A proppant is a material such as naturally occurring grains of sand of a predetermined size, or engineered materials, such as resin-coated sand, ceramic materials, sintered bauxite, or the like.

As used herein, the term "about" refers to a +/−10% variation from the nominal value. It is to be understood that such a variation is always included in a given value provided herein, whether or not it is specifically referred to.

As used herein, the term "component" is used interchangeably with the term "ingredient."

Figure 8:
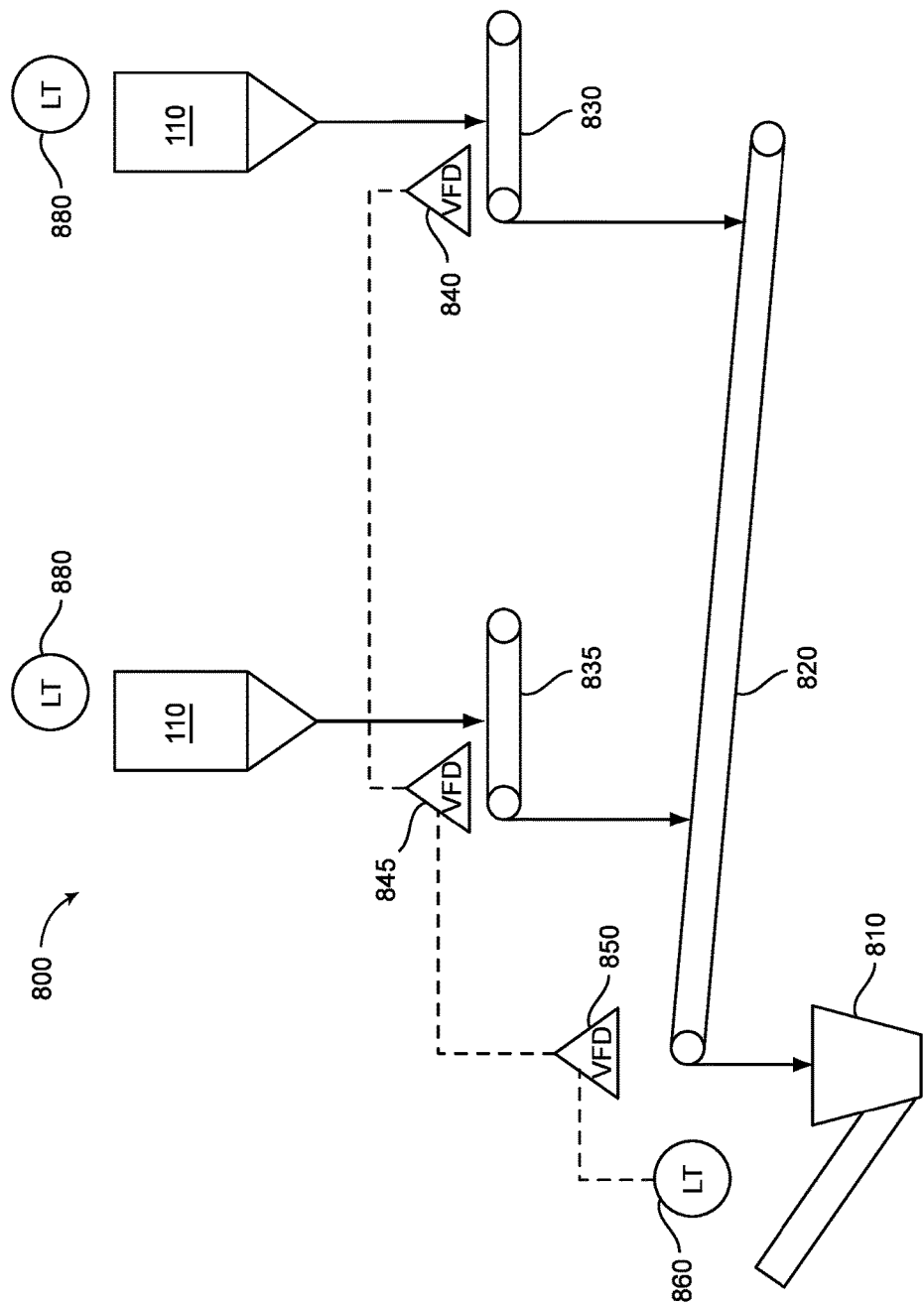

One aspect of the storage and blending system for multi-component granular materials as described herein is shown in FIG. 8. This embodiment includes vertically standing storage containers for storing components or ingredients of the multi-component composition on-site, a primary feeder 820 for feeding materials into the blender 810, a lead ingredient feeder 835 for dispensing a predetermined quantity of a major ingredient of the blend mixture from a storage container 110 to the central feeder 820 and one or more secondary feeders 830 for dispensing predetermined quantities of minor ingredients from their storage container 110 to the central feeder 820.

Transport and Deployment of On-Site Storage System

Figure 1:
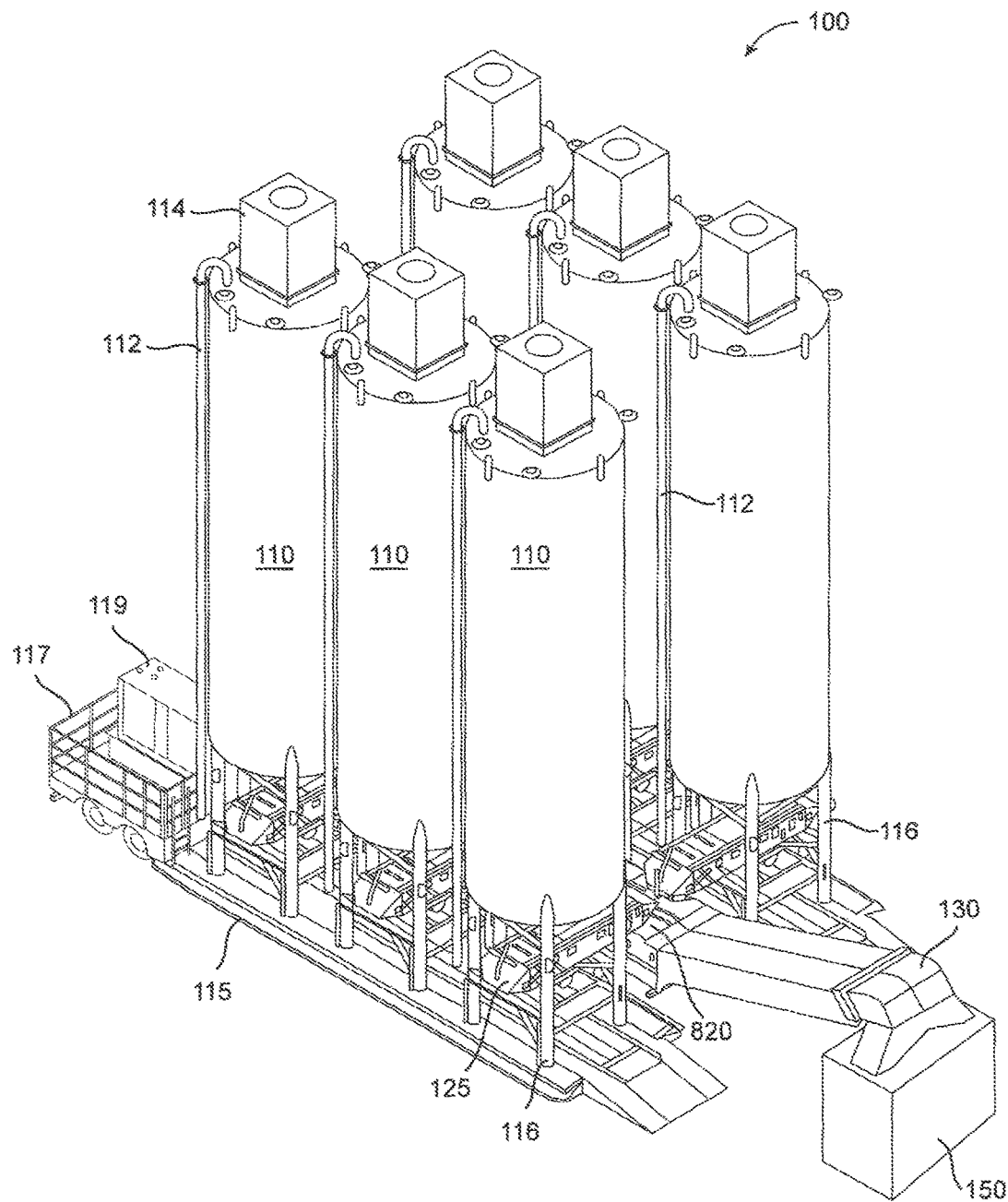

One embodiment of an on-site modular storage system 100 is shown in FIG. 1. The storage system 100 includes a plurality of mobile storage containers 110, also referred to herein as silos, arranged on a base platform 115. FIGS. 2-5 show one embodiment of transporting the storage containers 110 and deploying the containers on-site.

Figure 2:
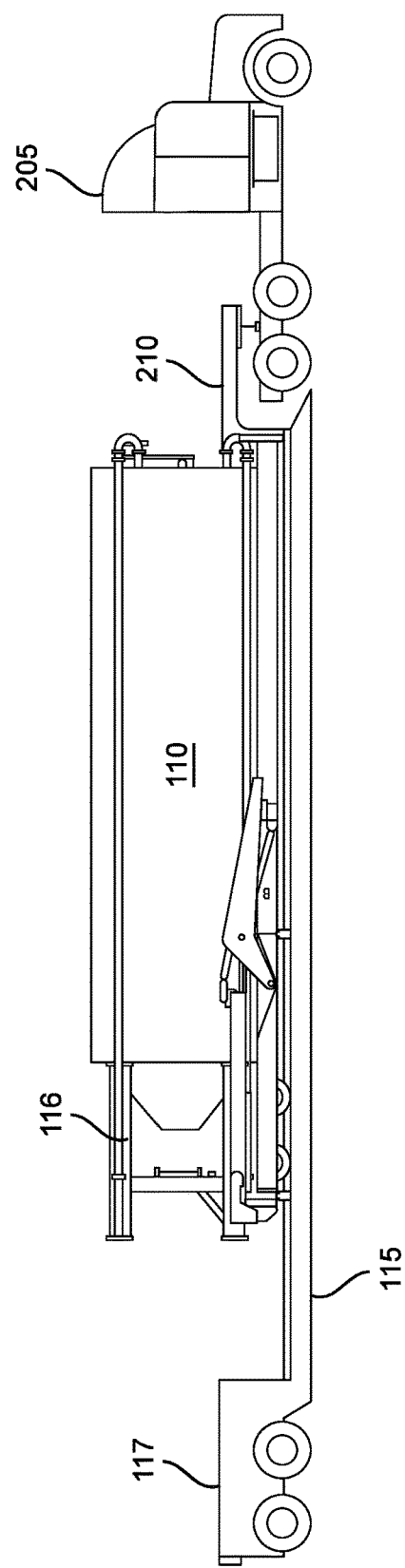

In a transportation configuration shown in FIG. 2, the silo 110 may be mounted on a trailer 210 and transported using a truck 205 to a site where the silo is to be employed. Upon arrival at the site, the truck 205 may be used to position the trailer 210 onto the surface of a base platform 115 that has been prepositioned at the site. The trailer 210, upon which is mounted a silo 110, is backed up onto the surface of a base platform 115 using a truck 205 that is coupled to the trailer. Typically, the tires of the trailer 210 are kept aligned and properly oriented via guiderails on the surface of the base platform 115. Optionally, tire stops may be employed to halt the movement of the trailer 210 at a desired position on the base platform 115. Once the trailer 210 is in a desired position on the base platform 115, the rear end of the trailer (the end of the trailer 210 furthest away from the truck 205 in FIG. 2) is raised using hydraulic jacks that may be located and attached on either side of trailer 210.

The base platform 115 serves to stabilize the silo 110 and the trailer 210 as the silo 110 is deployed into a vertical position. The base platform 115 also functions to provide stability to the silo 110 once it is in the vertical position, as well as when the silo 110 is retracted back onto the trailer 210 after deployment. The base platform 115 provides a rigid stable base for installation, operation and removal of the silos 110. Typically, one to three vertical free-standing silos may be positioned on a single base platform 115. The flat bottom base platform 115, allows a larger weight-bearing area on the ground resulting in lower ground pressure per unit weight of the silos.

Figure 3:
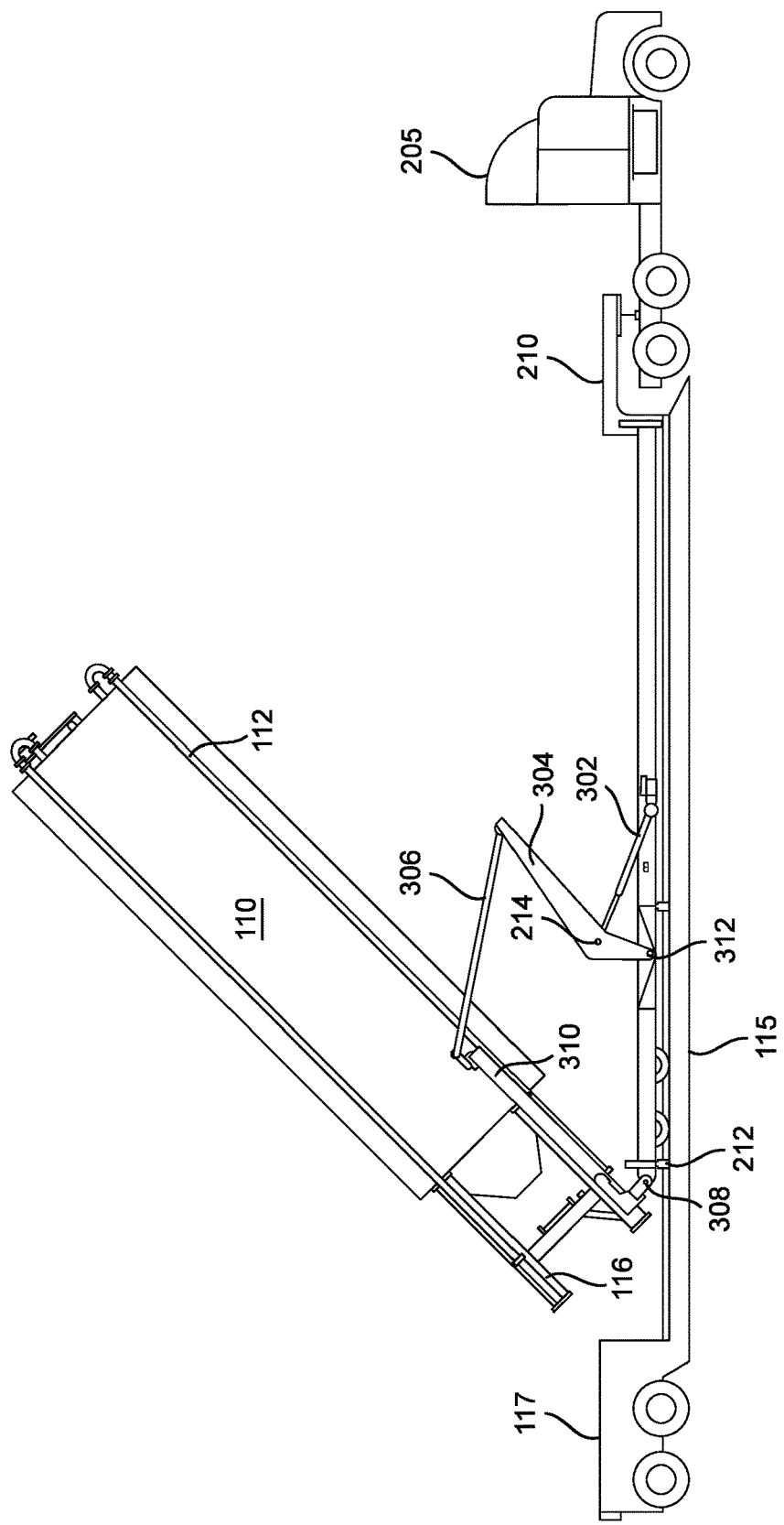
Figure 4:
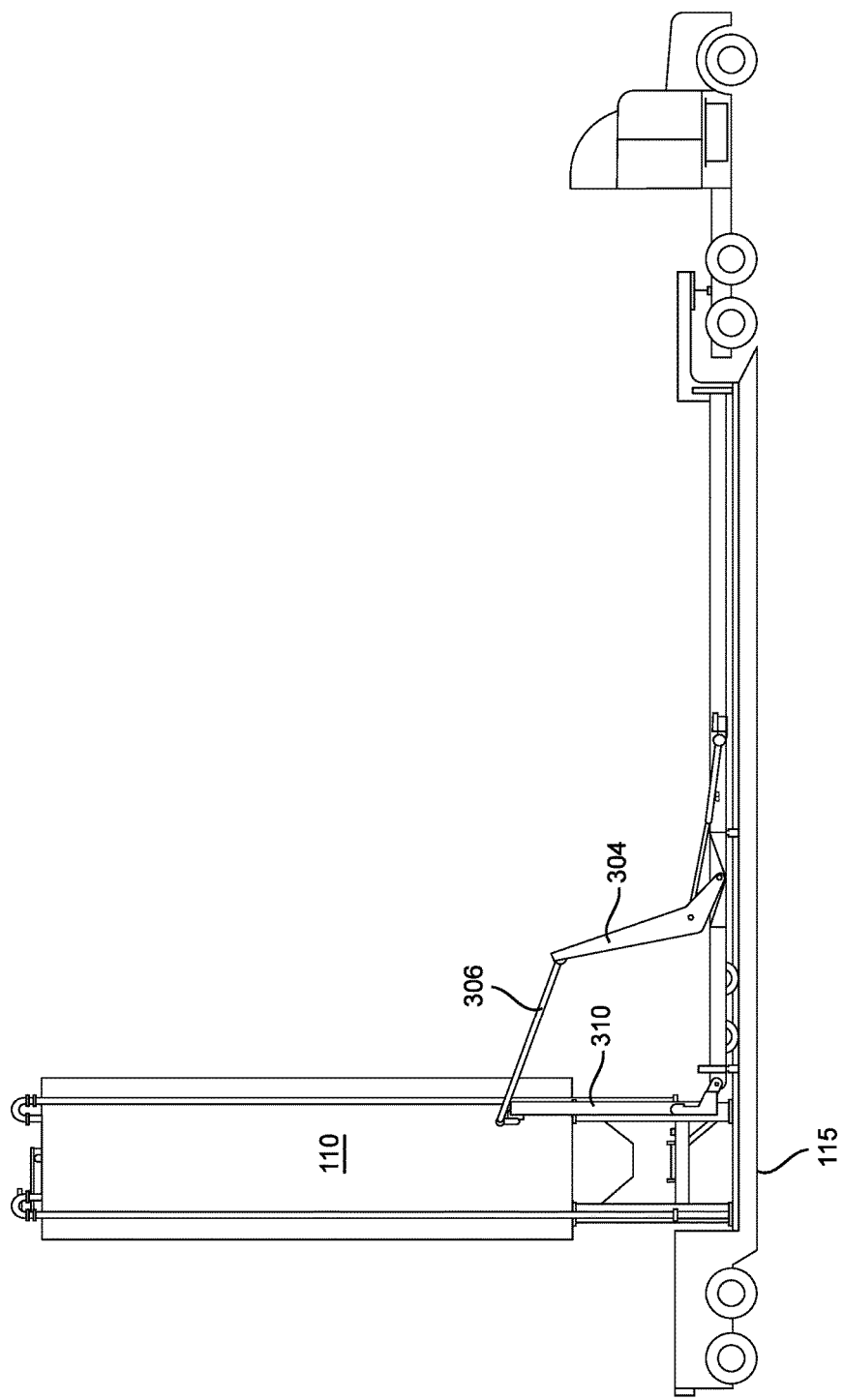
Figure 5:
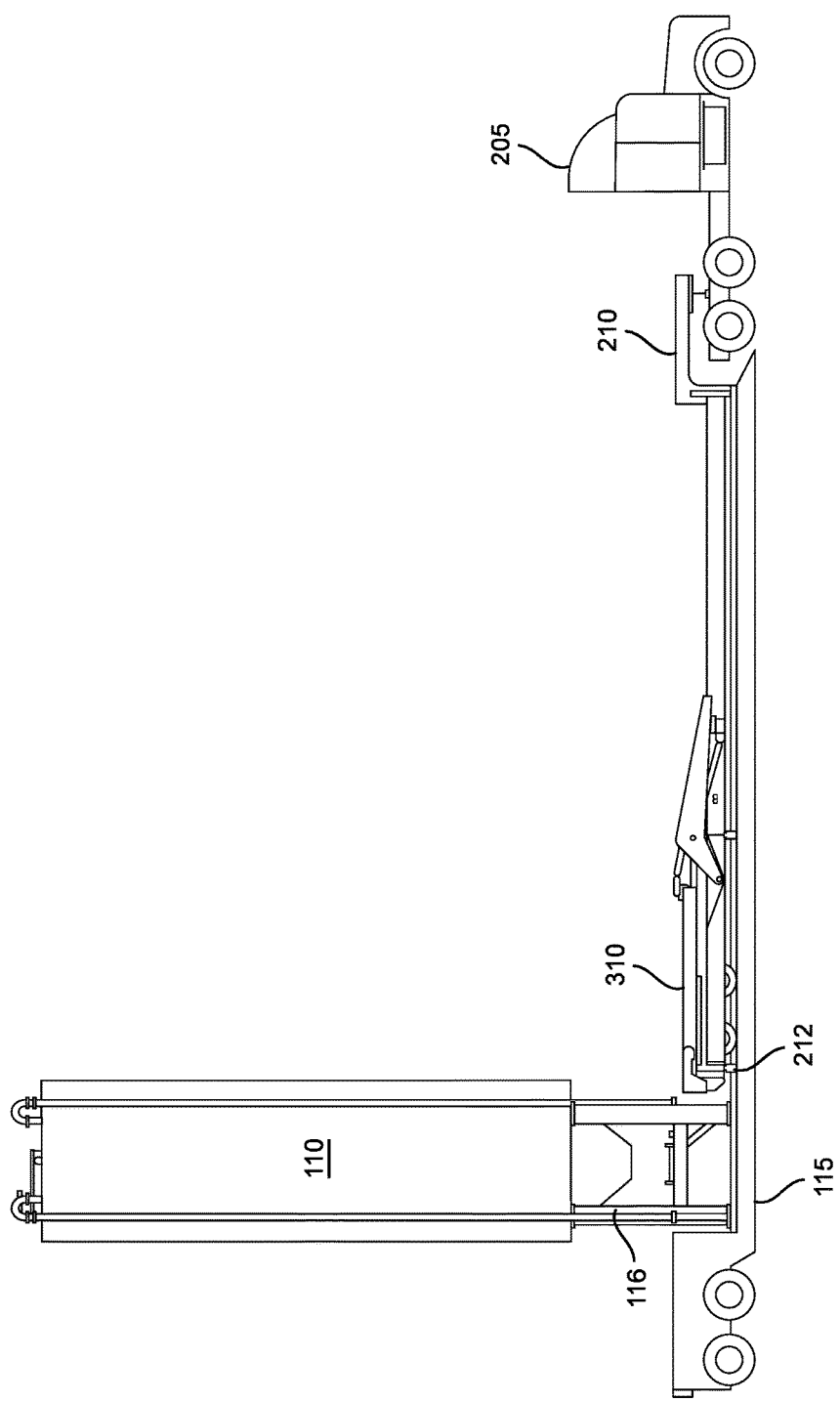

The trailer 210 has an erecting mechanism that allows for rotation of the silo during the raising or upending of the silo onto the base platform. One embodiment of the erecting mechanism is shown in FIGS. 3, 4 and 5. The erection mechanism includes a rocker arm 304 having a proximal end that is rotatably attached to the trailer 210 and a distal end attached to a flipper mechanism 310 that is adapted to be detachably coupled to a silo.

FIG. 3 depicts an actuator 302 (which in certain embodiments may be a hydraulic cylinder or rod) that is coupled to the trailer 210 and the rocker arm 304. The rocker arm 304 is coupled to the trailer 210 at a pin 312 which serves as a pivot point for the rocker arm 304 about which the rocker arm 304 can rotate. The rocker arm 304 is also coupled to an arm 306. Arm 306 is coupled to the flipper mechanism 310 which is in turn coupled to the silo 110. The flipper mechanism 310 is also coupled to the trailer 210 at pin 308. Pin 308 serves as a pivot point for the flipper mechanism 310 about which the flipper mechanism 310 can rotate. The silo 110 may be raised to a vertical position (or lowered to a horizontal position) by activating the actuator 302 such that the rocker arm 304 and arm 306 rotate the flipper mechanism 310 from a horizontal to a vertical position (or conversely from a vertical to a horizontal position.) The base platform 115 provides stability to the silo 110 as well as the trailer 210 during and after deployment or retraction of the silo 110.

The silo trailer 210 includes hydraulic jacks 212 at the rear of trailer which assist in the deployment of the silo 110 onto the base platform 115. The hydraulic jacks raise the trailer to allow silo clearance as the silo 110 is upended onto the base platform 115 and once the silo is raised the jacks lower the trailer 210 so that the silo legs 116 can be secured to the platform 115. Once the silo is secured to the platform, the hydraulic jacks continue to be lowered to disengage the trailer 210 from the silo 110, thereby freeing the trailer 210 and allowing the truck 205 to tow it away.

FIG. 4 depicts the silo 110 in a fully vertical position but still coupled to the flipper mechanism 310 which is in turn coupled to arm 306 and the rocker arm 304, while FIG. 5 depicts a configuration in which the silo 110 is free standing and disengaged from the flipper mechanism 310 and the flipper mechanism has been fully retracted.

Figure 6:
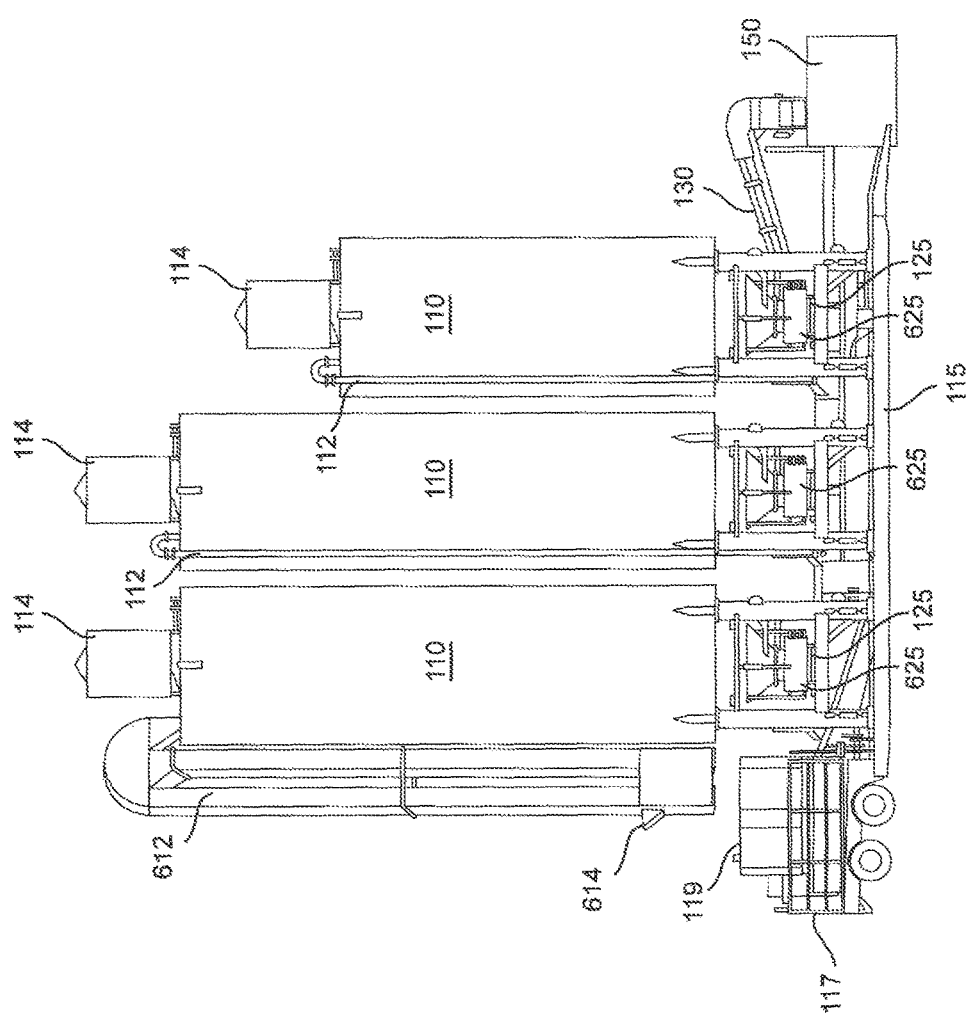

FIG. 6 illustrates a side view of a base platform 115 with three vertically standing silos 110 with their legs 116 secured to the base platform 115. The platform 115 typically has an operational section 117 with an attached power generator 119. A power distribution center is included for distribution of power to the one to three silos positioned on a base platform 115 with preinstalled hardware to operate a second base platform 115. The base platform and its associated operational section 117, with a set of wheels positioned under the operational section, may be transported from one location to another as though it were a trailer by attaching it to a tractor for relocation.

Managing the Inventory of Blend Materials at the Site

A preferred embodiment of an on-site modular storage system 100 is shown in FIG. 1. The illustrated embodiment of the modular storage system 100 includes six silos 110, also referred to as storage containers, arranged as two approximately parallel rows of three silos. Each line of three silos are secured to a base platform 115 with an operational section 117 at one end of each platform. A generator or power system 119 allows for the self contained operation of the storage and blending system 100.

One embodiment of the modular storage system 100 includes silos of different shapes and sizes. For example, the silos 110 shown is FIG. 6 include two different sizes of silos. In certain embodiments, smaller silos can be an advantage if one of the components for a specific blend is to be added in trace amounts.

Using the modular storage system 100, the storage and blending system can be expanded in a modular fashion to include additional silos. This modular expansion system allows the user to expand the volume of storage for each component (also referred to herein as an ingredient) of a multi-component composition (also referred to herein as a blend mixture). For example, each modular storage system 100 added provides an additional six silos for storage. Since each silo provides a separate storage compartment, the user can house a different component or ingredient in each silo.

Figure 7:
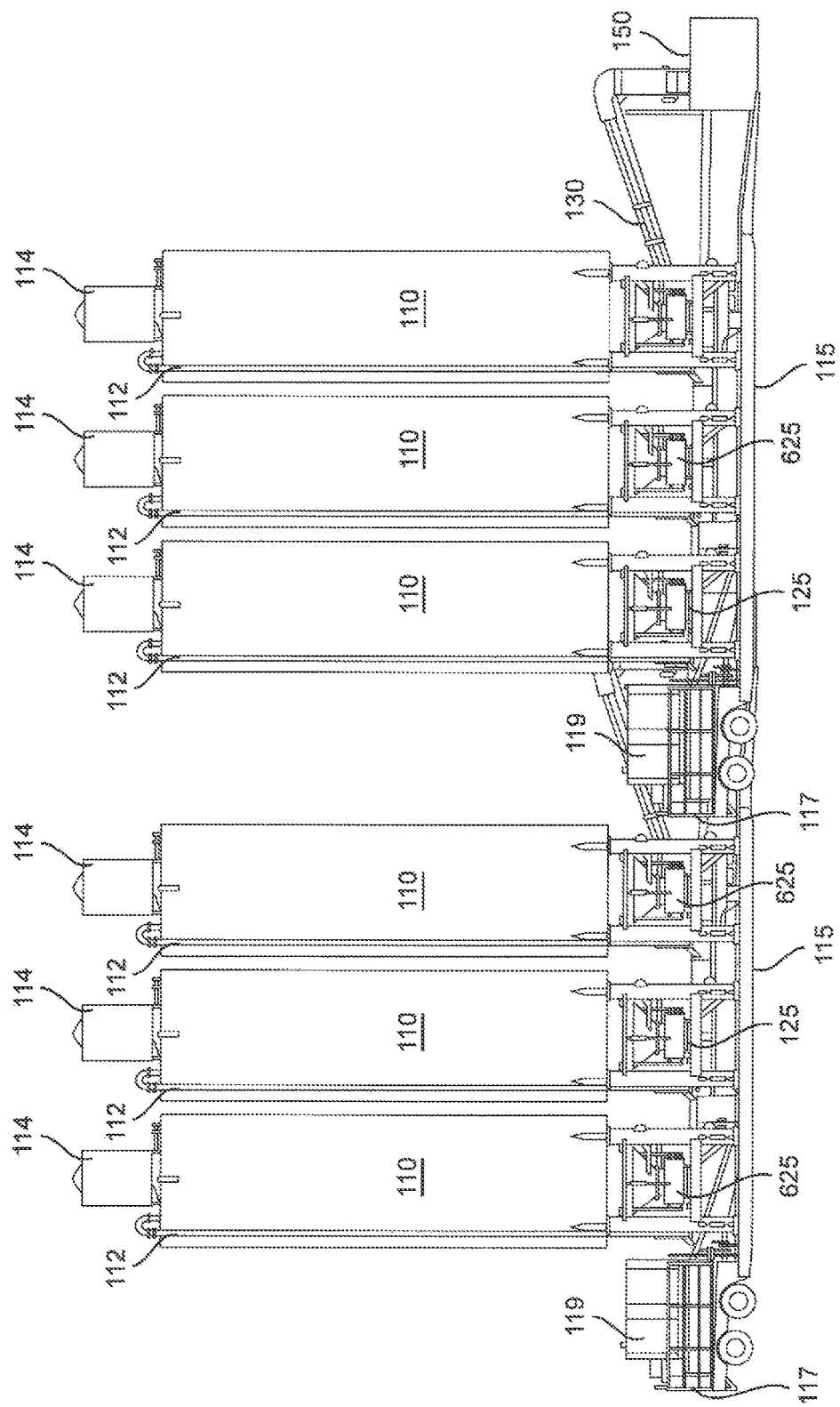

Alternatively, for storing large quantities of a component, such as proppant for a fracking job, then each additional six silos greatly increases the on-site storage of a component. For example, if the user is storing proppant on-site an additional six silos provides about 2,500,000 pounds of additional proppant storage, or a twelve silo system (as illustrated in FIG. 7) enables the pressure pumper to preload about 5,000,000 pounds of proppant or nominally one hundred over-the-road truckloads. This gives the pressure pumper a competitive advantage in that it eliminates potential delay and demurrage costs by allowing a large on-site inventory of proppant that is immediately available for use.

The silos 110 may contain one or more devices for monitoring the level of their contents. The monitoring devices may be sonic, radar, optical, inductive or mechanical level monitors. Measuring the contents is useful for inventory management, determining and controlling the rate of usage, and avoiding over filling or unexpected empty conditions as shown in FIG. 9A and described in more detail below.

For example, load cells or strain gauges attached to the silo legs 116 may be used to weigh the contents of the silo. Another example of a monitoring device is a pulsed radar monitor positioned inside a silo 110 at the top portion of the silo. The pulsed radar on the top of the silo is used to detect the profile of the granular component in the silo, as it takes the angle of repose of the component into consideration and calculates an effective level, or weight, of the component in the silo.

Figure 9A:
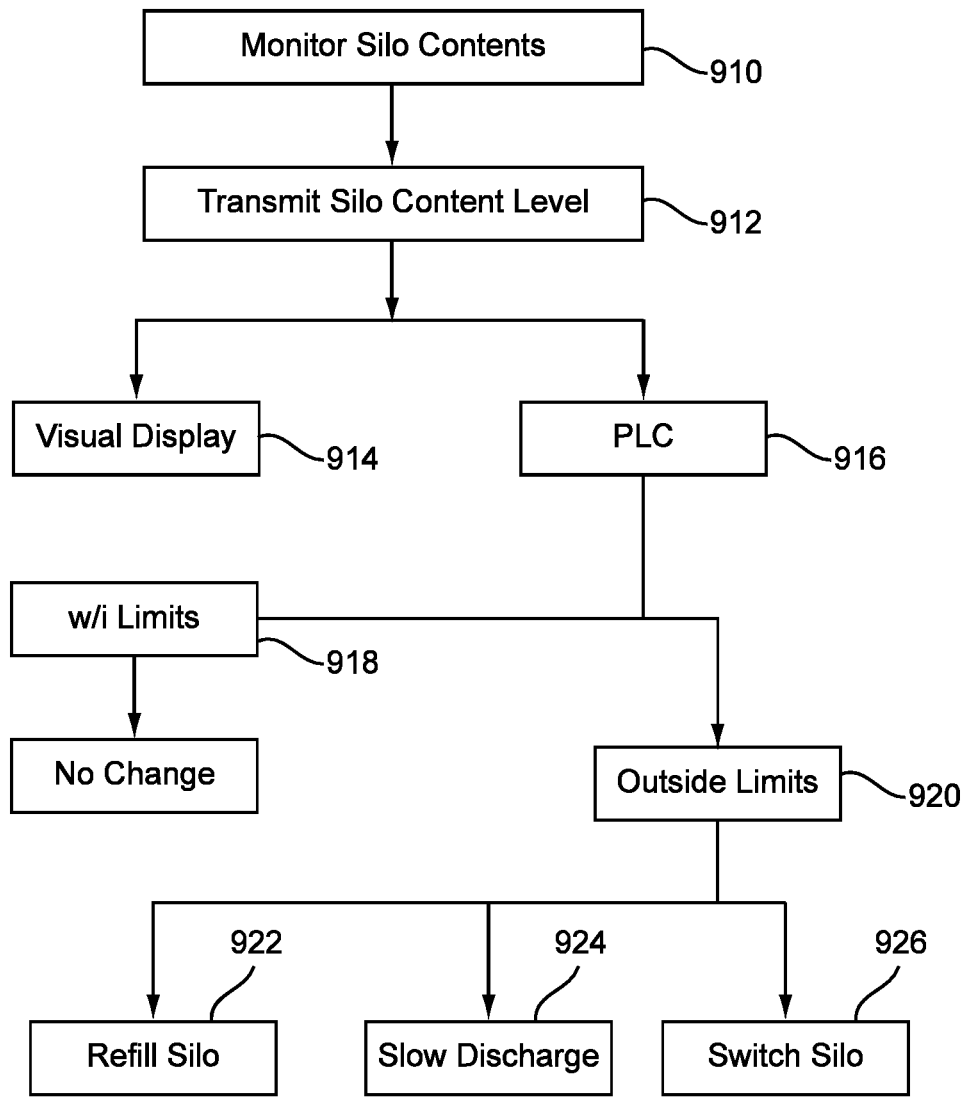
FIG. 9A is a flowchart illustrating a process for monitoring the content levels within the silos.

As indicated in FIG. 9A, the silo content level may be transmitted by a level transmitter (also referred to as a level transmitter) to a visual display 914 such as a daylight visible LED sign and/or to a human machine interface that is visible to the on-site operator, who can control the content level of the silo through a programmable logic control unit (PLC) 916 either by slowing the discharge of component 924 from the silo, switching to another silo for discharging that component 926, or start refilling the silo 922 with that component.

Preferred embodiments determine real time variations in the level, volume or weight of the contents of the silos and transmit the level of component in the silo to the PLC 916 that is programmed to automatically slow or stop the outflow of component from a particular silo at a pre-determined level, switch silo flows to ensure the uninterrupted flow of the component, or initiate the refilling of the silo to maintain the silo level of component within predetermined limits. This PLC-based monitoring and automatic operation removes the need to have visual monitoring of each silo or storage container, thereby reducing the number of personnel required at a given site location.

The regulation of the outflow of the component or ingredient from a silo is typically automated as illustrated in FIG. 9A. Controlling the inflow of component, or refilling of the silo, may be performed during the operation of the blending system. The silos 110 typically have one or more fill tubes 112 or bucket elevators 612 running up the side of the silo. The tubes 112 or bucket elevators 612 facilitate loading the granular component into the silo. A loading system such as a blower, an in-feed elevator, conveyor, bucket elevator, or the like, is operatively incorporated into fill tube 112.

One embodiment of the loading system is a pneumatic blower system. The silo is filled by the component supplier's truck and driver. The driver positions the pneumatic trailer into position and attaches a hose to the fill tube(s) on the exterior of the silo. The driver then adjusts valves on the blower to move the component or ingredient from the truck into the silo.

Another embodiment of the loading system is a bucket elevator 612 used to deliver material loaded in the elevator boot 614 into the top of the silos. A bucket elevator system can be incorporated inside of a large fill tube on the exterior of a silo, or the bucket elevator system 612 may be a different system attached to the silo 110 instead of or in addition to the fill tube 112. One embodiment of a bucket elevator attached to a silo is illustrated for the silo 110 shown on the far left-side of FIG. 6.

In preferred embodiments, each silo 110 of the modular storage system 100 is equipped with a vent at the top or side of the silo 110 to prevent the accumulation of excessive pressure inside the silo 110. For example, each silo may be equipped with a bin vent style dust filtration unit 114 on top of the silo. Each dust filtration unit 114 is sized to accommodate up to four pneumatic trailers filling an individual silo with a granular component such as sand. The dust filtration unit significantly reduces the presence of free-floating dust on location; particularly the health hazards associated with the large amount of silica dust associated with filling one or more silos with sand. The dust filtration unit 114 may be a self-cleaning unit that recycles the dust back into the silo rather than releasing it into the environment.

FIG. 9A is a flowchart illustrating a process for controlling the content level of components in the one or more silos in which the components are stored. In certain embodiments, the process may be a computer-implemented process (e.g., executable on the electronic control system or PLC). The electronic control system or PLC may implement the process by acquiring real-time operational data from the silo level monitors, evaluating the data against stored predetermined component content limits, minimal and maximal limits, and outputting appropriate control signals in the system.

As illustrated in FIG. 9A, the process includes the step of continually monitoring the silo contents level (block 910). The silo levels are communicated (block 912) to a visual display (block 914) and/or to a programmable logic control device (PLC) (block 916). Thus, the PLC constantly acquires real-time silo content level data from the silo level monitors, evaluates the data against stored predetermined component content limits, minimal and maximal limits, and outputs appropriate control signals in the system. If the content level data is within the programmed prescribed limits (block 918) then the PLC will not initiate any change in the blending system. If on the other hand, the silo level contents pass outside of the prescribed limits (block 920), then the PLC sends an alert to the silo technician and/or the system operator. The silo technician or the system operator is responsible for ensuring that the situation is addressed either manually by the silo technician or as instructed by the PLC to initiate refilling the silo (block 922), slowing the discharge from the silo (block 924) by instructing the variable frequency drives (VFDs) of the primary, lead and secondary feeders to slow, or to automatically turn off the lead or secondary feeder from the silo with a content level outside of the prescribed limits and to activate the discharge of that component from another silo (block 926).

Managing Inflow/Outflow of Blend Materials to the Blender

A schematic of one embodiment of the storage and blending system for multi-component granular materials as described herein is shown in FIG. 8. This embodiment includes multiple vertically standing storage containers for storing ingredients of the blend mixture on-site, a primary feeder 820 for feeding the ingredients into the blender 810, a lead ingredient feeder 835 for dispensing a predetermined quantity of a major ingredient from a storage container 110 to the primary feeder 820, one or more secondary feeders 830 for dispensing predetermined quantities of minor ingredients from their storage containers 110 to the primary feeder 820, a level monitor 860 that tracks the level of material in the blender 810 or the amount of material entering the blender 810, wherein the level of material in the blender is controlled by the feed rate of the primary 820, lead 835 and secondary feeders 830. The feed rate of the primary feeder 820 is controlled by a feeder regulator 850, the feed rate of the lead feeder 835 is controlled by a feeder regulator 845, and the feed rate of the secondary feeder 830 is controlled by a feeder regulator 840. The system, either in whole or in part, can be controlled either manually or electronically.

An on-site blending system allows oil field personnel to blend two or more products with precision. This enables pressure pumpers to precisely blend products for specific well designs that call for a blend of proppants such as a coated sand of a specific color with another proppant, a sand that is chemically coated with a traceable tag to allow the proppant to be traced down hole, or a blend of proppant and other bulk solid additives for tracking proppant position or performance.

FIG. 6 depicts one embodiment of three silos 110 positioned side-by-side on a base platform 115. Also depicted are shuttle conveyors 125 which are located under the exit ports beneath each silo 110 such that the shuttle conveyor 125 may be used to transfer material stored in one or more silos 110 onto a dual belt conveyor 130 or other receiving mechanism that delivers the material to a container, hopper or blender hopper 150.

FIG. 1 depicts six silos 110 vertically positioned on two separate neighboring base platforms 115 in a "six pack" configuration 100. In between the two rows of three silos is a central conveyor system 130, or primary feeder 820, that is fed by the shuttle conveyors 125, serving as lead or secondary feeders 830, 835, beneath each silo. The speed of the central conveyor system 130 as well as the shuttle conveyors 125 may be electronically controlled using a variable frequency drive that allows for the remote control of variation in the speeds of the conveyors. The central conveyor system 130 is used to transport the material stored in the silos 110 into a container, storage bin, hopper or blender hopper 150. Any number of silos can be employed at the site by adding additional six pack configurations such as illustrated in FIG. 7.

In preferred embodiments, the blending system 800 illustrated in FIG. 8 is designed to maintain a constant level and supply of component (which is adjustable) from the one or more silos to the blender 810 that feeds an on-site operation, such as a frac job. Since the system is designed to monitor granular solids or proppant amounts in real time, the system can furnish the rate at which one or more components are being removed from one or more silos, as well as the rate of ingredient delivery into the blender originating from the one or more silos.

In order to maintain an efficient on-site operation, it is necessary to control the rate that the blended composition, or proppant, is being removed from the blender and to balance that exit rate with the rate that the various components are being delivered to the blender. In a frac job, for example, a large amount of the blended proppant is continuously being pumped into the well from the blender so in order that the frac job is not interrupted due to the availability of the blended proppant, the rate at which each component of the blended proppant is released from the silos and delivered into the blender must be carefully regulated. In certain embodiments, flow of components from each silo is controlled using detectors and is automated by a programmable logic control unit (PLC).

The central or primary feeder 820, the lead ingredient feeder 835, and the secondary feeders 830 may be a variety of regulatable dispensers. For example, discharge chutes, gate valves, vibratory dispensers, augers or conveyors having adjustable speeds that can provide a regulatable feed rate from zero to a predetermined maximum flow of a particular component from a silo.

Conveyors, such as the central conveyor or shuttle conveyors described above, serve as preferred primary and secondary feeders since they move material, such as sand or other solid granular material, horizontally. This allows a lower overall installed height than using conventional inclined chutes or augers. Variable frequency drives are optionally installed to allow control of the speed of the shuttle and central conveyors and thus the component feed rate.

Shuttle conveyors 125 are preferred secondary and lead feeders 830, 835. The shuttle conveyor is reversible to allow discharging material from either side of the silo. As illustrated in FIG. 1, a shuttle conveyor 125 is typically positioned below each silo 110 on the base platform 115. The speed of the conveyor is remotely controlled via a digital electronic system, providing precise control of the discharge rate to match the required flow of the site operation.

A preferred embodiment of the primary or central feeder 820 is a dual belt conveyor 130. The dual belt conveyor and the shuttle conveyors typically have variable frequency drives (VFD) or other feeder regulators. As shown in FIGS. 1 and 8, one or more shuttle conveyors 125 (the secondary and lead feeders 830, 835 respectively) can feed components onto the central conveyor 130 (the primary feeder 820). The gentle transitions of the components from the shuttle conveyors to the dual belt conveyor limit the sifting segregation of the blend materials as they are dispensed from the silos 110 to the blender 150. A thorough mixing of all of the blend materials or components is performed downstream in the blender 150.

The quantity of each blend component dispensed from a silo 110 to a secondary or lead feeder 830, 835 and to the primary or central feeder 820 is controlled by regulating the feeder regulator 840 of the secondary feeder 830, the regulator 845 of the lead feeder 835 and the feeder regulator 850 of the primary or central feeder 820 in order to increase or slow their output speeds. The level of blend material in the blender 810 is used to balance the inflow and the outflow of the material in the blender. Thus, the level of material in the blender is important and is continuously monitored either by a designated operator or automatically by a level monitor 860 positioned at the end of the primary feeder to monitor the level of material in the blender or to monitor the quantity of material that drops into the blender. The blender level monitor 860 may be a sonic, radar, optical, inductive or mechanical level monitor. Preferred embodiments use a level sensing laser, a guided wave radar, a non-contact radar, or a pulsed radar device to constantly monitor the level of material in the blender. The monitoring device or level transmitter will communicate to the feeder regulators on the secondary, lead and primary feeders in order to increase or slow their speeds so that the level of material in the blender is adjusted and controlled. This system can be wireless or Ethernet cable connected.

In certain embodiments, the storage and blending process may be a computer-implemented process (e.g., executable on the electronic control system or PLC). The electronic control system or PLC may implement the process by acquiring real-time operational data from the blender level transmitter 860, evaluating the quantity of component outflow from the blender and balancing the rate of inflow of components into the blender with the rate of outflow of the blended mixture from the blender 810. This balancing on inflow and outflow is achieved by controlling the dispensing of each component into the blender by the feedback regulation of the speed of dissemination of each component from a silo within certain predetermined limits and outputting appropriate control signals to the VFDs of the primary and secondary feeders to speed up or slow down the speed of the feeders and therefore the rate of dispensing of the components into the blender to match the outflow of the components from the blender.

Figure 9B:
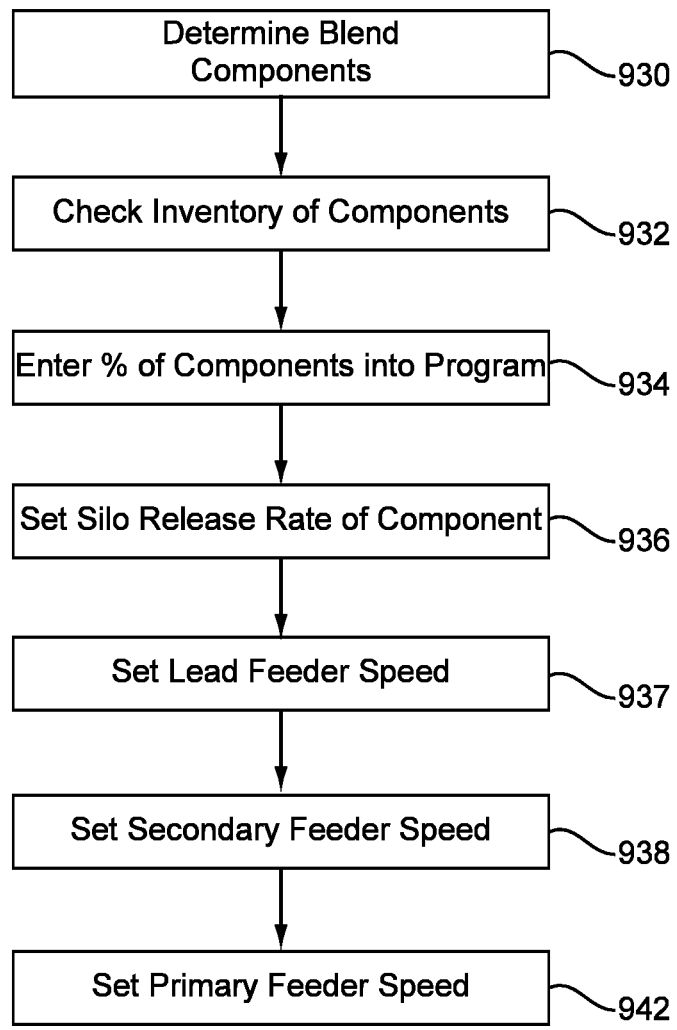
FIG. 9B is a flowchart illustrating a process for controlling the blending of multiple components of a blend mixture.

As illustrated in FIG. 9B, the process includes the step of determining the desired blend of components (block 930). Checking the on-site inventory (block 932) to ensure that sufficient quantities of each component in the multiple component blend is either on-site or within an area close enough to reach the site in time to fulfill the quantities needed to complete the on-site operation.

The calculated proportion of the desired blend components is entered into the data residing on the PLC (block 934) and used to program the rate of release of each component from the silo containing that component (block 936). The release rate of each component is used to calculate the desired feeder rate to provide the desired rate of dispensing that component from the appropriate silo. The PLC then instructs the setting of the VFD 845 to set the lead feeder speed (block 937) and the VFD 840 to set the secondary feeder speed (block 938) to the calculated feeder rate. The PLC also calculates the desired delivery speed of the components into the blender 810 and instructs the automatic setting of the VFD 850 of the primary feeder 820 to run the primary feeder at the desired speed (block 942).

Figure 9C:
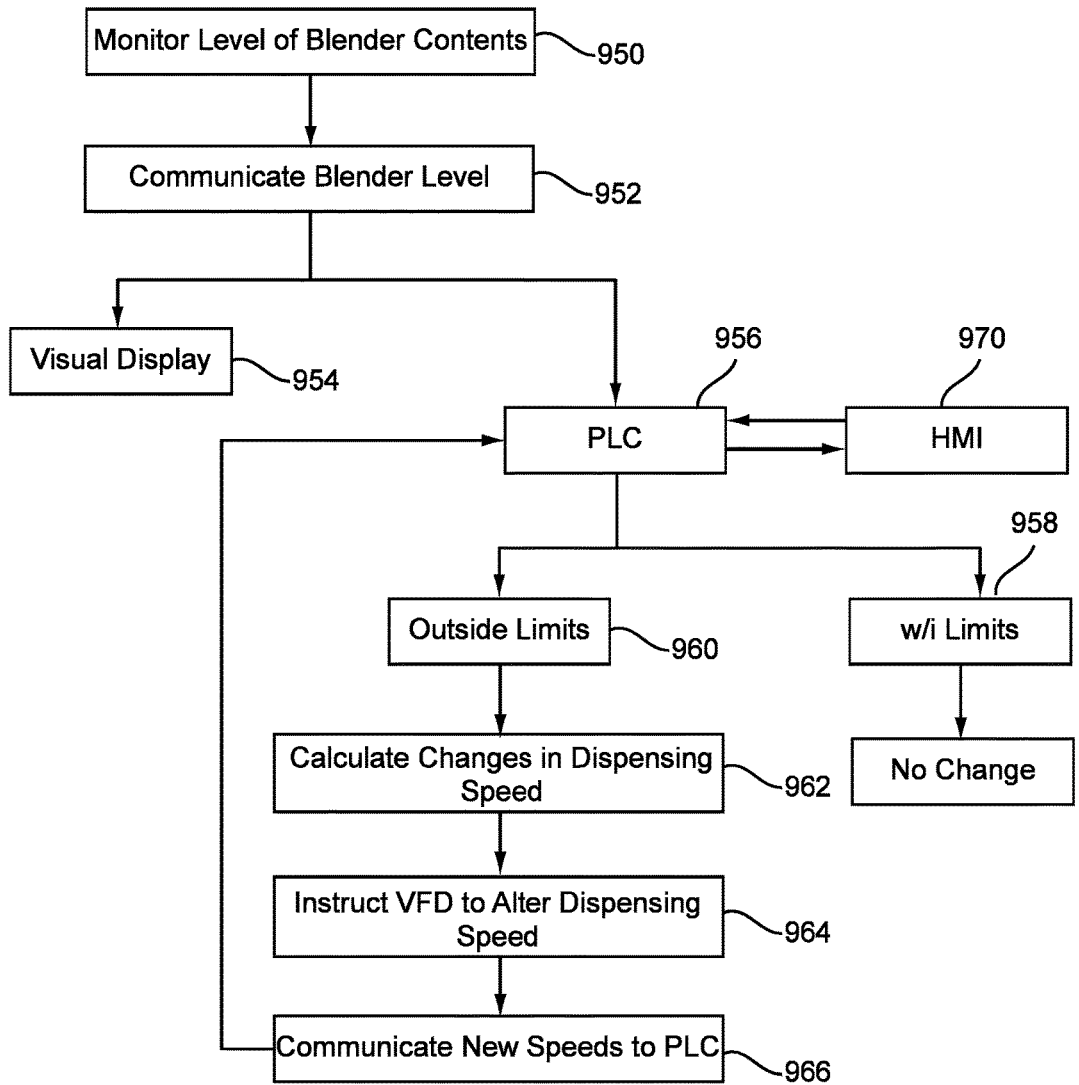
FIG. 9C is a flowchart illustrating a process for controlling the blending process based on the level of the contents within the blender.

As shown in FIG. 9C, the blender level monitor and transmitter 860 continuously monitors the level of material in the blender (bloc 950) and continuously communicates the material level in the blender to the PLC (bloc 952). Thus, the PLC constantly acquires real-time blender material level data from the blender level monitor 860. The PLC may display this information on a visual display on the operational section 117 of the platform 115 (bloc 954) and/or on the human machine interface (bloc 970) connected to the PLC (bloc 956).

The PLC will evaluate the acquired blender level data against stored predetermined allowable limits on the level of the blender contents. If the level of the blender contents is within the prescribed limits (bloc 958) then no adjustment of the component dispensing speed is necessary. However, if the level of blender contents is above or below the prescribed limits (bloc 960), then the PLC will immediately calculate the desired changes in the dispensing speed of each component (bloc 962) and instruct the speed regulator of dispenser of each component to alter the dispensing speed of each component to the desired speed (bloc 964) so that the inflow of components into the blender is carefully controlled. The new dispensing speed of each component is then communicated to the PLC (bloc 966).

For example, when belt conveyors are used for the secondary, lead and primary feeders; the calculated desired belt speed of each of the secondary, lead and primary feeders will be calculated and PLC will instruct the feeder regulators or VFDs of the primary, lead and secondary feeders to adjust the speed of the feeders to the calculated desired speed. The PLC is programmed to continuously calculate any necessary changes in the speed of the primary, lead and secondary feeders that might be needed to maintain the desired level of material in the blender within a predetermined range. Any changes that need to be made in the speed of the primary, lead and secondary feeders are communicated to the feeder regulators or VFDs of those feeders. Once the prescribed changes to the primary, lead and secondary feeder rates are made, then the new speed of the feeders is communicated back to the PLC.

One embodiment of the blending and storage system includes a single or group of small, modular storage vessels that could be physically installed on top of the primary feeder or central conveyor. In some cases a bulk solid chemical may have a very low dose rate and requires a much smaller inventory than the typical full size silo. In this embodiment, the small bulk tank(s) would typically utilize a dispenser such as a small volumetric screw conveyor, a small vibratory feeder or shuttle conveyor to discharge its contents to the primary feeder. The PLC would regulate the discharge rate of these small storage vessels by regulating the motor speed of the dispenser.

An Example of a Two Component Blend

Figure 10:
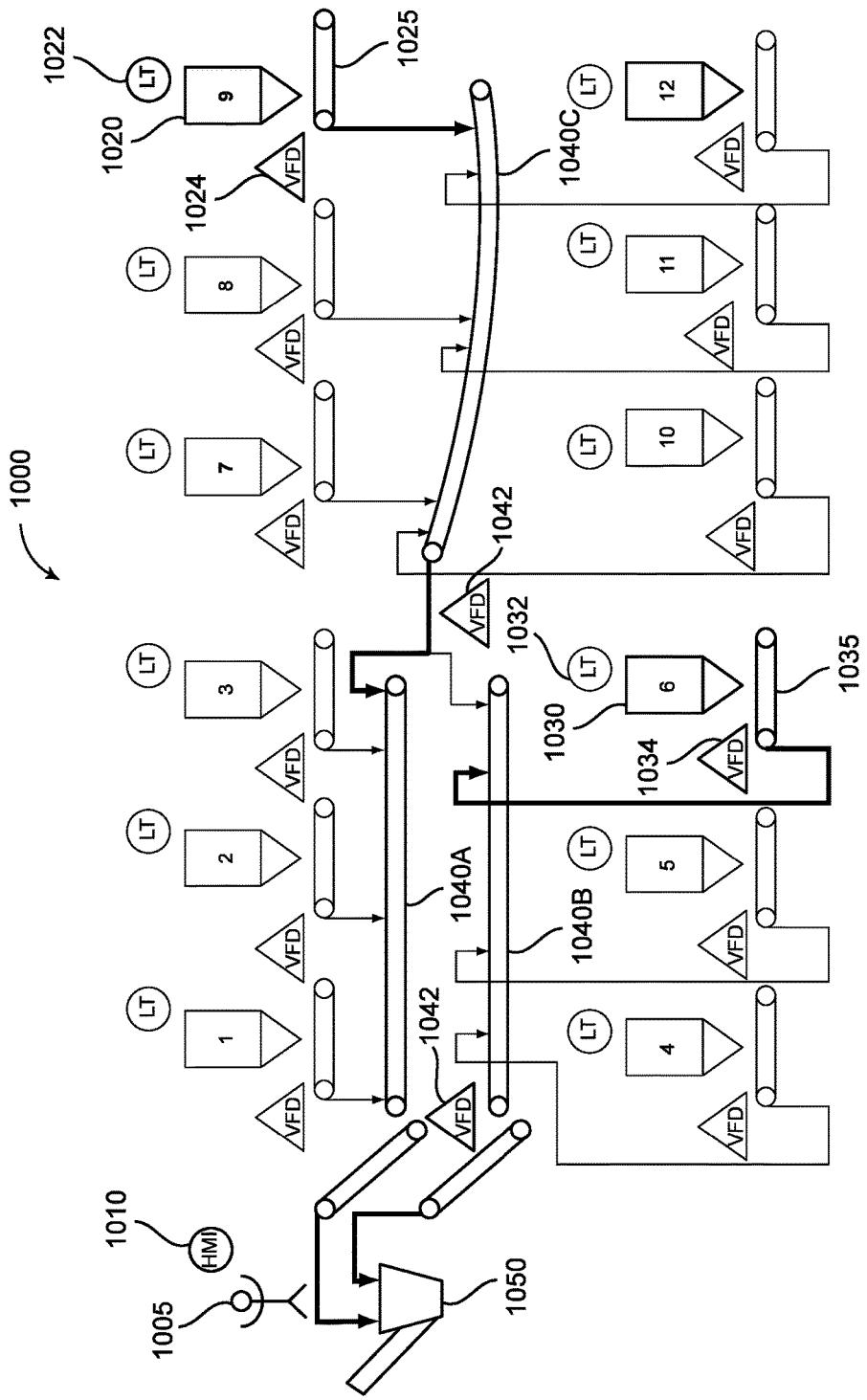

FIG. 10 shows a schematic of a preferred embodiment of the storage and blending process for a two component blend 1000 using a 12-pack system as shown in FIG. 7. The operator 1005 of the blending process manages the storage and blending system at a human machine interface (HMI) 1010 that is interfaced and in communication with the PLC that controls the various aspects of the process. Before initiating the blending process 1000, the operator 1005 determines the desired blend for the site operation. For a two component blend, the operator determines the identity and the ratio of the two components to be blended.

The component added in the larger quantity to the blend is typically designated the primary or major component and the component added in the smaller quantity is designated the secondary or minor component. For example, the operator may want to pump 200,000 pounds of a primary raw proppant with a 5.0% blend of a secondary coated proppant. The ratio of the two components would be 20:1 raw:coated or primary:secondary. This information is entered into the PLC at the HMI 1010.

The variable discharge or exit port of the silos holding the primary raw proppant and the secondary coated proppant are set to allow the discharge flow from the two silos to be significantly different. Thus, if flow of component through the exit ports of the two silos are controlled via mechanical choke gates 625 (as illustrated if FIGS. 5 and 7), then the choke gate of the primary component silo might be set for 5 inches and the choke gate of the secondary component silo would have a smaller setting of maybe 0.5 inches. The choke gate settings for the two silos holding the two components (i.e., silo 1020 for the primary raw proppant and silo 1030 for the secondary coated proppant) are entered into the HMI.

Figure 11:
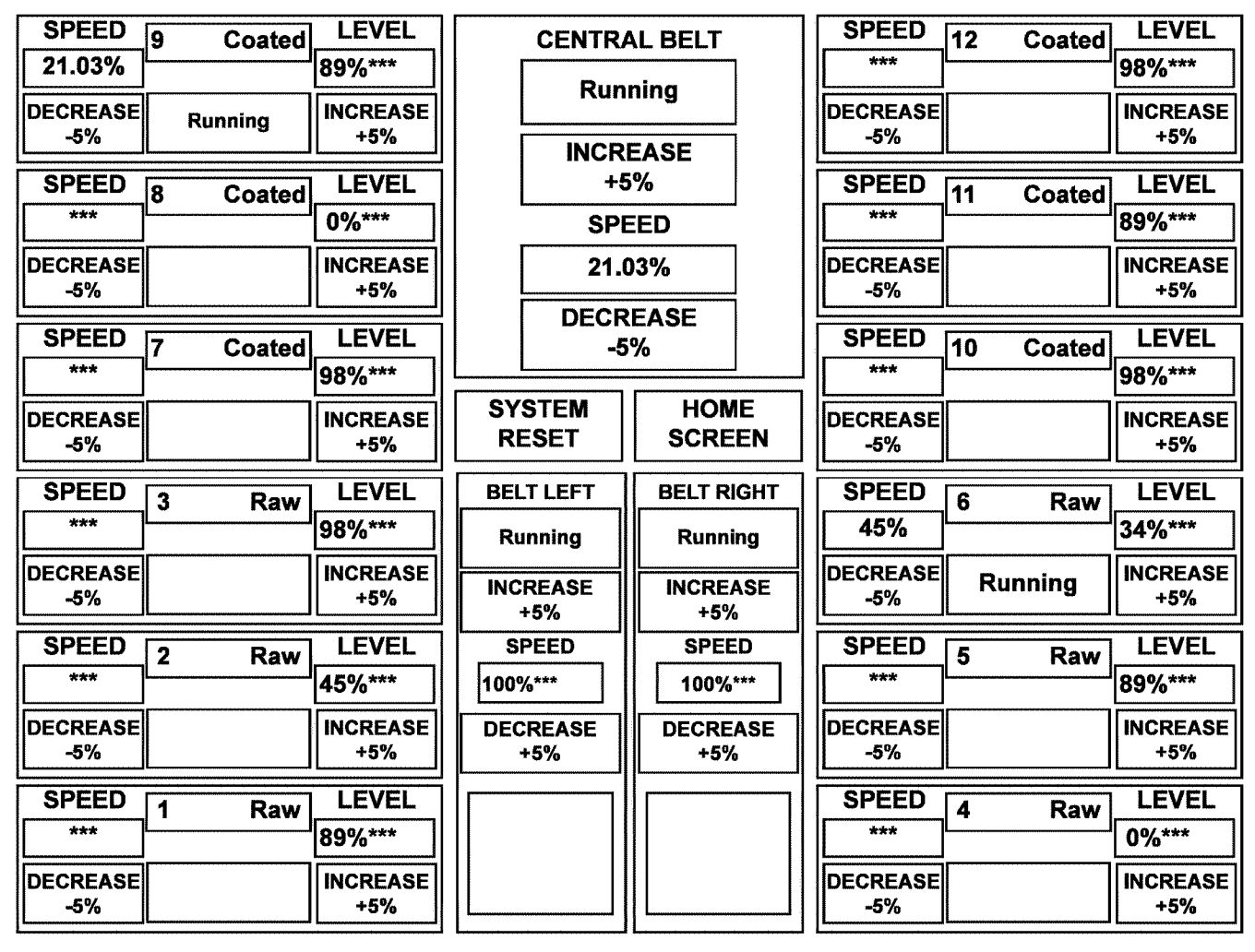

The operator navigates to the main screen on the HMI, illustrated in FIG. 11, that is used to control the blending process. The operator enters the percentage of the components desired in the blend, as well as the choke gate settings on the HMI. The operator then turns on the central conveyors 1040A, 1040B and 1040C at 100% speed. The operator selects the primary silo 1030 and the secondary silo 1020 based on the component contained therein. The level of material in the blender 1050 is controlled by governing the speed of the central conveyors and the shuttle conveyors. In this embodiment, the level of material in the blender is monitored by the operator, who will either speed up or slow down the speed of the conveyor belts to control the content level within the blender.

Basically the operator will control the level of material in the blender by either increasing or decreasing the speed of the primary shuttle conveyor 1035 on silo 1030. The PLC then calculates a remote set point for the appropriate speed for the central conveyors 1040A-C and the secondary shuttle conveyor 1025 based on the operator's input of the choke gate opening for the primary silo 1030 and the secondary silo 1020, as well as the desired blend ratio in decimals.

The PLC calculates the belt rate of the conveyors based on the real time belt speed of the primary shuttle conveyor 1035 and the gear ratios between the primary conveyors 1040A-C and the secondary shuttle conveyors 1025 and 1035. The PLC calculates the remote set point (RSP) in Hertz for the VFDs of the conveyors. The basic calculation performed by the PLC is as follows:

$$RSP_{1025} = RSP_{1035} \times F_{HZ} \times [BR/(C_{1020}/C_{1030})] \times F_{GR}$$

where the RSP of the Secondary Shuttle 1025 ($RSP_{1025}$) =RSP of the Primary Shuttle 1035 ($RSP_{1035}$)×a Factor to convert the percentage Belt Speed into Hertz ($F_{Hz}$)×the Blend Ratio (BR) divided by the ratio of the Choke Gate Openings for the Secondary Silo 1020 ($C_{1020}$) and the Primary Silo 1030 ($C_{1030}$)×a Factor accounting for the difference in the gear ratio between the Primary Shuttle 1035 and the Secondary Shuttle 1025 ($F_{GR}$).

Whenever, the PLC calculates a change that needs to be made in the speed of the shuttle and central conveyors, the PLC instructs the VFD 1042 of the motors that run the central conveyors 1040A-C, the VFD 1024 of the motor that runs the secondary shuttle conveyor 1025, and the VFD 1034 of the motor that runs the primary shuttle conveyor 1035 to alter their speeds in direct response to the blender level and the real time belt speed of the primary shuttle conveyor 1035.

The calculated results are automatically used to adjust the secondary shuttle 1025 speed and the speed of the central conveyors 1040A-C. FIG. 11 shows one embodiment of main screen on the HMI and its displayed settings for the blending system 1000 illustrated in FIG. 10. In the example shown in FIG. 11, the operator has selected silo 1030 (numbered silo 6 on the main screen) to provide the raw proppant, or primary component, and silo 1020 (numbered silo 9 on the main screen) to provide the coated proppant, or secondary component. The operator has input a desired blend ratio of 5.00% of the coated to the raw proppant and entered the primary choke gate at 5.0 inches and the secondary choke gate at 0.5 inches. As the operator manages the level of material in the blender, the belt speed of the primary shuttle conveyor has reached 45%. The PLC has calculated and sent a remote set point of 21.03% (or 12.617 Hz) to the central belt conveyors and the secondary shuttle conveyor.

Alternatively, the blending process may include a level monitor and transmitter over the blender. The level monitor may be any monitoring device such as a laser, non-contact radar, guided wave radar or similar device to monitor the appropriate level in the blender with set predetermined limits. Thus, whenever the level in the blender goes outside of either an upper or lower predetermined limit the PLC will automatically recalculate a desired speed for the central conveyors and the primary and secondary shuttle conveyors. The recalculated remote set points are sent to the VFDs of the motors running the central conveyors and the primary and secondary shuttle conveyors. By resetting the VFDs, the speed of the central and shuttle conveyors are reset to adjust the material level in the blender to within the predetermined limits. The blending process 1000 can deliver up to 30,000 pounds per minute of proppant or blend mixture to the blender.

Another embodiment, of the blender system 1000 includes a silo monitor 1032 for the primary silo 1030 and a silo monitor 1022 for the secondary silo 1020. The use of silo monitoring within the blending process is described in more detail below.

An Example of a Seven Component Blend

Figure 12:
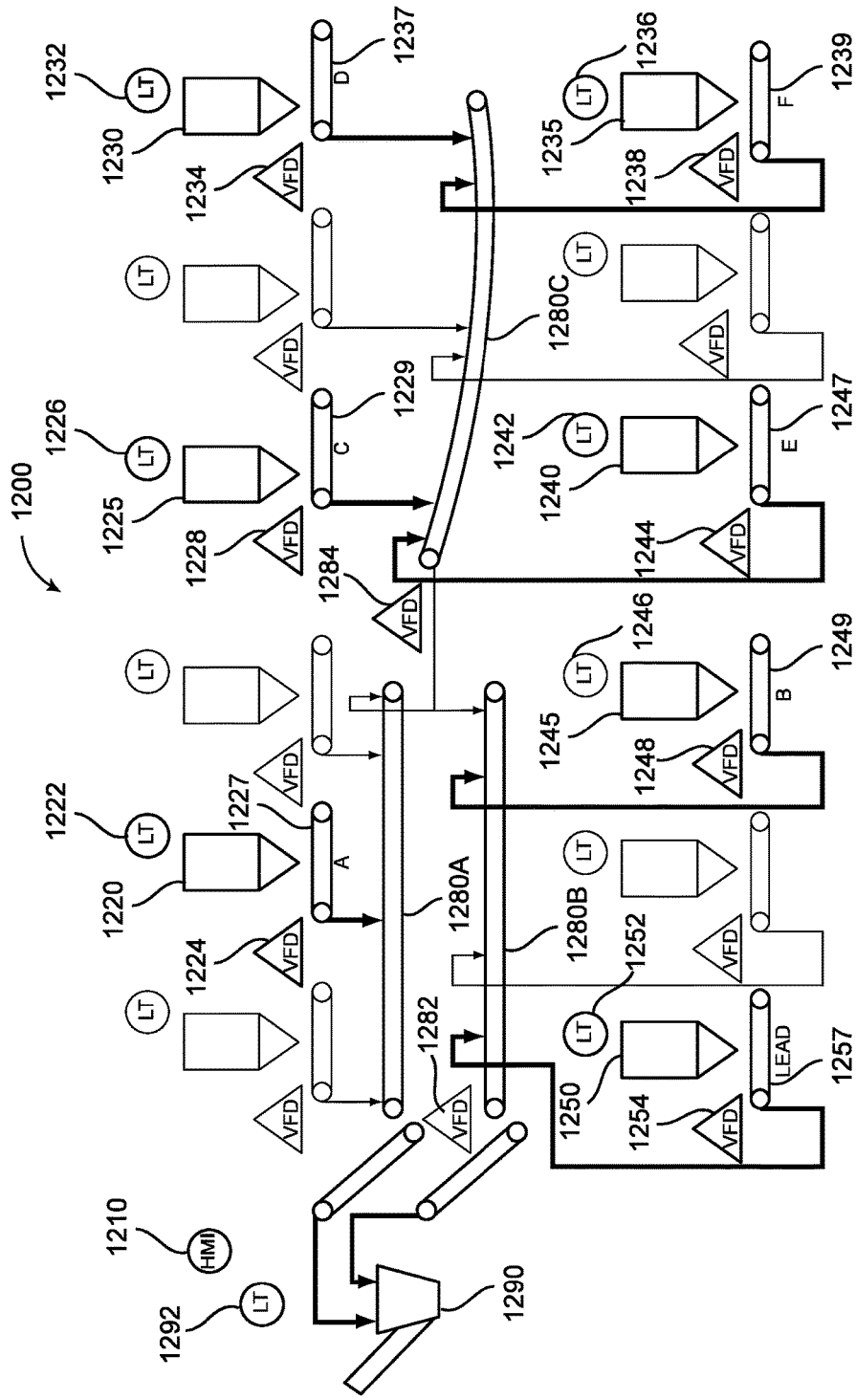

FIG. 12 shows a schematic of one embodiment of the storage and blending process 1200 for a seven component blend using the 12-pack system shown in FIG. 7. The operator monitors the progress of the blending process 1200 at the human machine interface (HMI) 1210 that is interfaced with and in communication with the PLC that controls the various aspects of the process. Before initiating the blending process 1200, the operator determines the desired blend for the site operation. For a seven component blend, the operator determines the identity and the percentage composition of the seven components to be blended. The component added in the largest quantity to the blend is typically designated the lead component and the desired amount of the other six components to be added is calculated in relationship to the amount of the lead component being added. Furthermore, the secondary shuttle speeds of the six non-lead components are calculated with respect to the primary shuttle speed of the lead component as illustrated in Table 1.

TABLE 1

| | Component | | | | | | |
|---|---|---|---|---|---|---|---|
| | Lead | A | B | C | D | E | F |
| % of Blend | 78% | 5.00% | 2.50% | 1.00% | 1.50% | 7.00% | 5.00% |
| Blend Ratio to Lead Component | NA | 6.41% | 3.21% | 1.28% | 1.92% | 8.97% | 6.41% |
| Shuttle Choke Gate (inches) | 5 | 0.5 | 0.25 | 0.25 | 0.25 | 0.5 | 0.5 |
| Shuttle Speed | 45% | 28.8% | 28.8% | 11.5% | 17.3% | 40.4% | 28.8% |

For example, the operator may want to pump 200,000 pounds of the multi-component blend mixture comprising 156,000 pounds of the lead component; 10,000 pounds of components A and F; 5,000 pounds of component B; 2,000 pounds of component C; 3,000 pounds of component D; and 14,000 pounds of component E. The ratio of component A to the lead component would be 5:78 or 6.41%. Similarly the ratios of components A, B, C, D, E, and F are calculated by the PLC and displayed on the HMI for the operator's reference.

The opening of the choke gate 625 for each silo holding the lead component and the secondary components A, B, C, D, E, and F is entered into the PLC. The opening of the choke gate 625 for each silo may be set manually, or it may be set automatically if the choke gate, or releasing device on the exit port of the silos, has a variable opening that can be electronically controlled.

The operator then turns on the central conveyors 1280A, 1280B and 1280C at 100% speed. The operator then selects the primary or lead silo 1250 containing the lead component. Secondary silo 1220 containing component A, silo 1225 containing component C, silo 1230 containing component D, silo 1235 containing component F, silo 1240 containing component E, and silo 1245 containing component B are selected based on their respective contents. The PLC calculates the desired belt rate of all of the conveyors based on the real time belt speed of the lead shuttle conveyor 1257 associated with silo 1250 that contains the lead component and the gear ratios between the central conveyors 1280A-C and the secondary shuttle conveyors 1227, 1229, 1237,1239, 1247 and 1249. The PLC calculates remote set points (RSPs) in Hertz for each of the VFDs of the motors that run the conveyor belts.

The basic calculation performed by the PLC for each of the secondary shuttle conveyors is as follows:

$$RSP_{SEC} = RSP_{LEAD} \times F_H \times [BR/(C_{SEC}/C_{LEAD})] \times F_{GR}$$

where the RSP of each Secondary Shuttle ($RSP_{SEC}$)=RSP of the Lead Secondary Shuttle 1257 ($RSP_{LEAD}$)×a Factor to convert the percentage belt speed into Hertz ($F_H$)×the Blend Ratio (BR) for the component associated with the secondary shuttle divided by the ratio of the Choke Gate Openings for the Secondary Silo ($C_{SEC}$) and the Lead Silo 1250 ($C_{LEAD}$)×a Factor accounting for the difference in the gear ratios between the Lead Shuttle 1257 and the Secondary Shuttle ($F_{GR}$).

The calculated results are automatically used to adjust the belt speed of the secondary shuttles 1227, 1259,1237,1239, 1247 and 1249 and the central conveyors 1280A-C. When the level of the blending material in the blender reaches a point that falls within the prescribed limits, the belt speed of the primary lead shuttle conveyor 1257 should have reached about 45%. Then the PLC calculates a remote set point for of the central and secondary shuttle conveyors. The calculated remote set point is sent to each of the central and secondary shuttle conveyors (e.g., 28.8% to the secondary shuttles of the silos containing components A, B and F).

The level of material in the blender 1290 is controlled by governing the speed of the central and the shuttle conveyors. The level of material in the blender is monitored by a blender level monitor 1292 that transmits the real time blender levels to the PLC. The level monitor may be any monitoring device such as a laser, non-contact radar, guided wave radar or similar device to monitor the appropriate level in the blender with set predetermined limits. Thus whenever the level in the blender goes outside of either an upper or lower limit, the PLC automatically calculates a desired speed for the central and secondary conveyors that will bring the level of material in the blender back within the prescribed limits. The PLC calculates a remote set point for each motor 1282,1284 running the central conveyors, the motor 1254 running the lead shuttle conveyor, and the motors 1224, 1228, 1234, 1238, 1244, 1248 running the secondary shuttle conveyors. The PLC transmits the calculated RSP to each motor and instructs the VFDs of those motors to reset the speed of the central and shuttle conveyors to adjust the material level in the blender to within the prescribed limits. Thus the PLC instructs the VFDs of the lead shuttle conveyor 1257, the secondary shuttle conveyors 1227, 1229, 1237,1239, 1247 and 1249, and the central conveyors 1280A-C to alter their speeds in direct response to the blender level.

Another embodiment, of the blender system 1200 includes a silo monitor and transmitter for each silo: monitor 1252 for the lead silo, monitor 1226 for silo 1225, monitor 1232 for silo 1230, monitor 1236 for silo 1235, monitor 1222 for silo 1240, and monitor 1246 for silo 1245. The use of silo monitoring within the blending process is described in more detail below.

The Coordination and Control of the Storage and Blending System

In certain preferred embodiments, the flow of granular solid components from the silos or storage containers of the invention to the container, hopper or blender is automatically regulated and controlled by a pre-set program or a program determined on-site by conditions at the site operation. The monitoring and operating technology is PLC-based and removes the need to have visual monitoring of the silos, primary and secondary feeders, and the blender. The PLC-based operating technology reduces the number of technicians required at a given site location and the costly side effects of potential human mistakes. Preferred embodiments of the automated storage and blending system only requires one technician to operate the entire system, whereas conventional systems require up to six on-site technicians. The PLC-based storage and blending system allows the on-site technician or operator to adjust and change the blending of components through an on-site human machine interface (HMI) to meet the changing needs of the on-site operation.

In certain embodiments, the process may be a computer-implemented process (e.g., executable on the electronic control system or PLC). The PLC may implement the process by acquiring real-time operational data from the central and shuttle conveyors, the blender level monitor, and the silo monitors; evaluating the data against stored prescribed limits for the optimal performance of each aspect of the storage and blending system, and outputting appropriate control signals to interfaced devices within the system to maintain the operation of those devices within the stored prescribed limits to achieve an optimized multi-component mixture for a variety of desired blends throughout an ongoing site operation.

Figure 13:
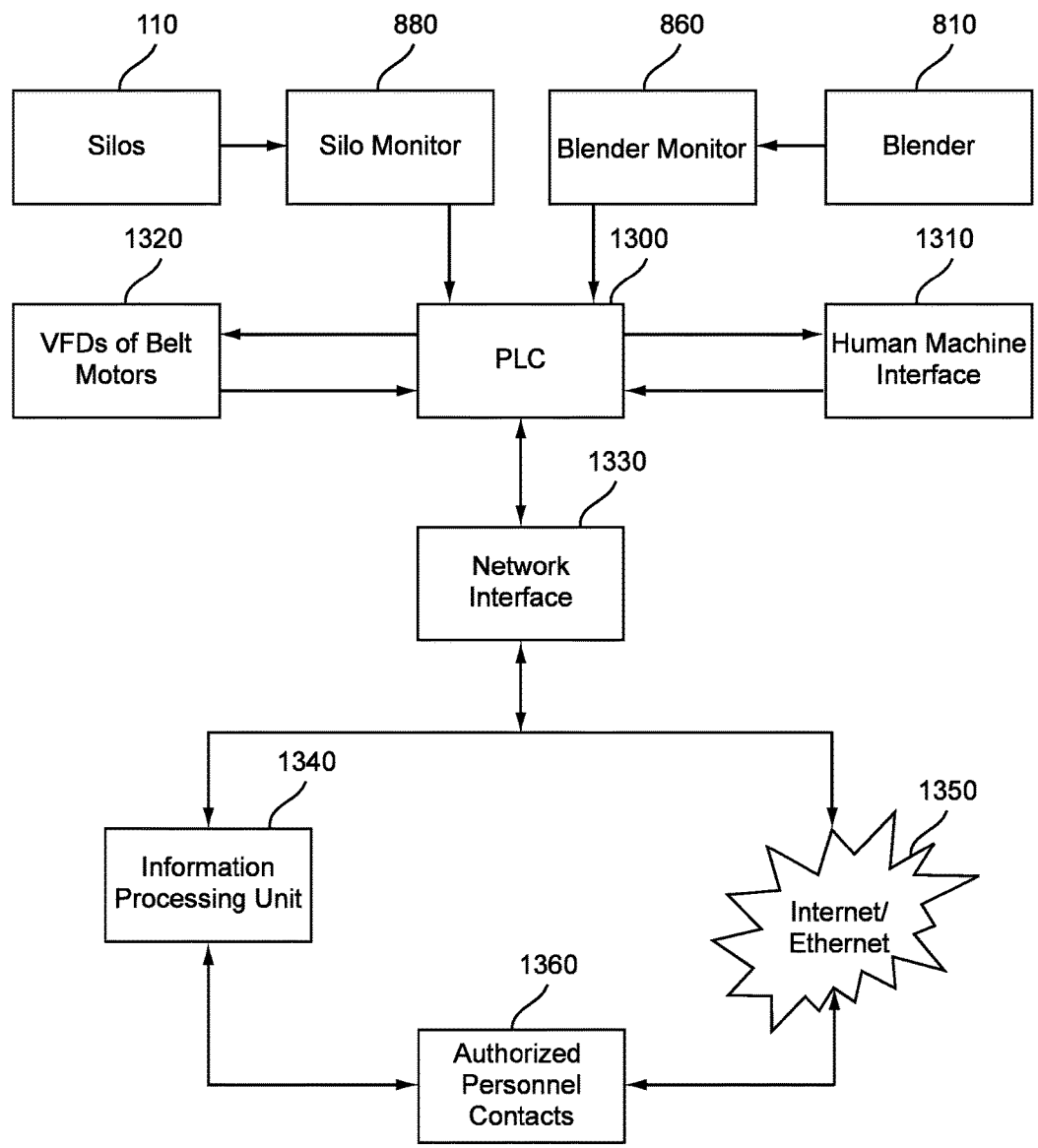

FIGS. 9C and 13 are schematic illustrations of the blending process steps and of the information flow in the PLC-based operating system and process. The process includes the step of continually monitoring the content level of the silos 110 and the blender 810 with level monitors 880 and 860 respectively. The PLC-based technology may implement the process at least partially by interfacing with a plurality of devices distributed throughout the system. The monitors may be configured to dynamically measure, sense, and/or otherwise determine the content levels of the silos and the blender. The real time content level data is processed and used to generate instructive signals that are transmitted to the devices within the system in order to maintain their operation within preset limits of optimal performance.

The PLC 1300 typically includes or is interlinked with the monitors 880 and 860, an on-site Human Machine Interface 1310, the VFDs of the belt motors 1320 for the lead and secondary shuttle conveyors and the central conveyors, one or more Network Interfaces 1330, one or more Information Processing Units 1340, communication networks such as the Internet/Ethernet 1350, Authorized Personnel Contacts 1360, memory, and one or more communication buses for interconnecting the devices within the system.

For example, the desired operating data, as well as actual operating data, for the blending system configured to produce a plurality of multi-component blends can be retrieved and stored in memory. Memory includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory optionally includes one or more storage devices remotely located from the PLC. Memory, or alternately the non-volatile memory device(s) within memory, includes a non-transitory computer readable storage medium. In some implementations, memory or the computer readable storage medium of memory stores: the data from the various blending programs for a variety of multi-component blends and the operational data from the processing and use of those blends, or a subset of such data; an operating system that includes procedures for handling various basic system services and for performing hardware dependent tasks; a network communication module that is used for connecting the PLC 1300 to other computers or to an Information Processing Unit 1340 via the one or more communication network interfaces 1330 (wired or wireless) and one or more communication networks 1350, such as the Internet, other Wide Area Networks, Local Area Networks, Personal Area Networks, metropolitan area networks, Virtual Private Networks, local peer-to-peer and/or ad-hoc connections, and so on; and Authorized Personnel Contacts 1360.

The PLC 1300 and/or the Information Processing Unit may include control logic that can utilize the stored data to determine variables in the processing and performance of the different multi-component blends that have been made and tested. The control logic of the PLC will continually communicate the data analyzed by the PLC to the Information Processing Unit.

Silo Monitoring System

Measuring the silo contents on a real time basis is useful for inventory management, determining and controlling the rate of usage, and avoiding over filling or unexpected empty conditions. Each silo 110 may contain one or more devices for monitoring the level of their contents. The monitoring devices may be sonic, radar, optical, inductive or mechanical level monitors.

Determining real time variations in the level, volume or weight of the contents of the silos and transmitting the level of component in each silo to the programmable logic control unit (PLC) that can automatically slow or stop the outflow of component from a particular silo at a pre-determined level, switch silo flows to ensure the uninterrupted flow of the component, or initiate the refilling of the silo to maintain the silo level of component within predetermined limits. The PLC 1300 orchestrates the activation, deactivation, and cooperation of the various components of the silo monitoring system.

The software installed on the PLC processes the data received from the Human Machine Interface (HMI) 1310 at the control panel, the level monitors 860, 880 on the blender and the silos, the VFDs 850, 845, 840 on the central, lead and secondary feeders, and a secure information processing unit (IPU) 1340. The software communicates information and instructions based on the processed data back to the HMI 1310 at the control panel, the blender level monitor 860 and the silo level monitors 880, the VFDs 850, 845, 840 on the central, lead and secondary feeders, and the IPU 1340.

Figure 14:
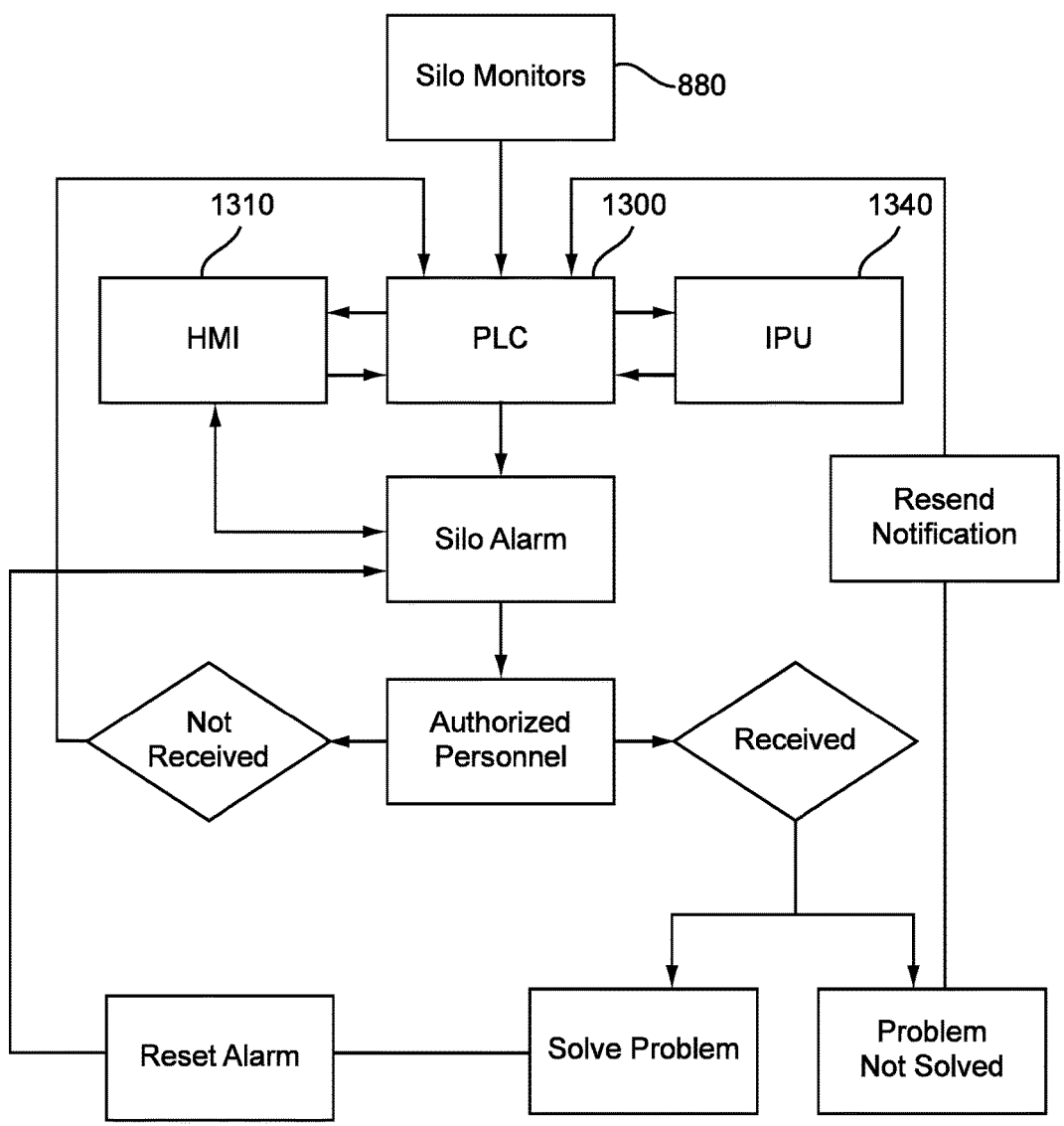

Preferred embodiments of the PLC 1300 and/or the IPU 1340, shown in FIGS. 13 and 14, includes diversified communications equipment allowing the PLC and/or the IPU to communicate with the Internet and/or an Ethernet 1350. The IPU 1340 typically includes at least one of the following communication devices: a modem to allow the system to communicate via a "landline" internet connection (e.g., DSL or cable modem), a satellite antenna and/or a cellular antenna to communicate via a cellular communication tower data connection The IPU communication device is designed to establish and maintain communications with the internet and silo technicians that are authorized to slow or stop the outflow of component from a particular silo at a pre-determined level, activate component flow from a different silo to ensure the uninterrupted flow of the component, or to initiate the refilling of the silo to maintain the silo level of component within predetermined limits.

In certain embodiments the PLC and/or the IPU maintain several lists or databases that include one or more list of authorized silo technicians and their cell phone numbers and/or e-mail addresses. The list of names, e-mail addresses and cell phone numbers on the authorized personnel list 1360 serves as a reference list for a "Notification Group". The site operator can add or delete names and phone numbers to the Notification Group. The Notification Group is a list of names from the authorized personnel list designating which individuals are to be notified whenever the level of component in a silo varies from the predetermined limits set by the site operator or calculated by the PLC and/or IPU.

A schematic representation of the information flow by the associated notification software is shown in FIG. 14. The notification software allows each individual in the Notification Group to be notified either with cellular telephone text messages or by e-mails. Furthermore, the site operator may require that any person notified actually acknowledges receipt of the notification.

Whenever the silo contents fall below a predetermined limit, the notification software will immediately notify the authorized silo technician or component provider. The notification software may require that the authorized silo technician verify receipt of the notification, as well as verify that the silo technician has solved or not solved the problem that caused the silo alarm to go off. The software will also alert the site operator through the HMI and inform the site operator which silo technician has been notified. The site operator will monitor the situation to ensure that the problem has been addressed, or will resend the alarm notification to the silo technician or to another authorized silo technician.

If neither the silo technician nor the site operator have sent instructions to slow or stop the outflow of component from a particular silo, switch silos contributing that component to the feeders, or verify the refilling of the silo to maintain the desired level of component within the silo, then the notification software will resend the notification to the next silo technician on the list. Once the silo content level has reached a critical level, the notification software will not only notify the silo technician that was notified before, but will also initiate an on-site alarm, such as flashing red lights or an audible siren. On the other hand, if the silo technician does solve the problem and the silo content levels fall back within the prescribed limits then the notification software will display that fact on the HMI for the operator's information and will reset the alarm system.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a non-transitory computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing provides a detailed description of the invention which forms the subject of the claims of the invention. It should be appreciated by those skilled in the art that the general design and the specific embodiments disclosed might be readily utilized as a basis for modifying or redesigning the natural gas supply system to perform equivalent functions, but those skilled in the art should realized that such equivalent constructions do not depart from the spirit and scope of the invention as set forth in the appended claims.

What is claimed is:

1. A blending system comprising:
   (a) a blender that blends at least two ingredients into a blend mixture;
   (b) a flat platform positioned on a ground surface and configured for a trailer to drive upon;
   (c) a plurality of storage containers, each container vertically positioned on the platform on a set of legs and equipped with a storage container monitoring device that dynamically monitors a level, mass or amount of an ingredient contained in that storage container and a discharge exit port oriented on a lower end of the container toward the platform and among the legs, wherein at least one storage container contains each ingredient of the blend mixture;
   (d) a choke gate mounted on the exit port of each container, wherein an adjustable opening of the choke gate controls a discharge rate of the ingredient through the exit port of each container;
   (e) a central feeder oriented proximal to and parallel to the platform, wherein the blender is positioned at a first end of the central feeder such that the central feeder delivers the ingredients of the blend mixture into the blender;

(f) at least one ingredient feeder designated for each ingredient in the blend mixture, each ingredient feeder mounted below one container choke gate and oriented to deliver the ingredient exiting from the choke gate of that storage container to the central feeder;

(g) a central regulator that regulates a variable delivery rate of the blend mixture from the central feeder into the blender;

(h) a plurality of ingredient regulators, with at least one ingredient regulator designated for each ingredient feeder, where each ingredient regulator regulates a variable delivery rate of the ingredient from its ingredient feeder to the central feeder;

(i) a blender monitor positioned at the first end of the central feeder wherein the blender monitor measures a level, mass or amount of the blend mixture entering the blender or within the blender;

(j) an adjustable blender control device that varies an exit rate of the blend mixture from the blender; and (k) a control system in communication with the blender monitor, the blender control device, the storage container monitoring devices, each ingredient feeder regulator, and the central feeder regulators, wherein the control system is configured to dynamically balance the delivery rate of the blend mixture into the blender with the exit rate of the blend mixture from the blender and to regulate each ingredient feeder regulator to adjust the delivery rate of each of the ingredients onto the central feeder to equal a designated percentage of that ingredient within the blend mixture.

2. The blending system of claim 1, wherein the blender monitor is a sonic, radar, optical, inductive or mechanical level monitor.

3. The blending system of claim 1, wherein the ingredient regulators are variable frequency drives in communication with a set of motors that run the central, and ingredient feeders.

4. The blending system of claim 1, wherein the size of the choke gate opening is greater for ingredients present in higher amounts in the blend mixture.

5. The blending system of claim 1, wherein the control system calculates a remote set point for an appropriate speed for each ingredient feeder based on the dimensions of the choke gate opening and a desired blend ratio in decimals of the ingredient within the container.

6. The blending system of claim 5 wherein the control system dynamically evaluates if the level, mass or amount of ingredient contained in each storage container is within predetermined limits and if the level, mass or amount of one ingredient is not within predetermined limits for that ingredient, the control system will signal the feeder regulator associated with that ingredient to alter the rate of delivery of that ingredient from its designated storage container to the central feeder.

7. The blending system of claim 1, wherein the central feeder and the ingredient feeders are shuttle conveyors.

8. A blending system comprising:

(a) a blender that blends at least two ingredients into a blend mixture;

(b) a plurality of storage containers where each container is equipped with a storage container monitoring device that dynamically monitors a level, mass or amount of an ingredient contained in that storage container and a discharge exit port, wherein at least one storage container contains each ingredient of the blend mixture, a primary container stores a major ingredient, and one or more secondary containers store one or more secondary ingredients;

(c) a choke gate mounted on the exit port of each container, wherein an adjustable opening of the choke gate controls a discharge rate of the ingredient through the exit port of each container and wherein a first choke gate on the primary container has a larger opening than any of the choke gates mounted on secondary containers;

(d) a central feeder having a distal end positioned proximal the blender such that the blend mixture is discharged directly from the distal end of the central feeder into the blender;

(e) a blender monitoring device positioned at the distal end of the central feeder to detect a real time level of material contained in the blender;

(f) a lead ingredient feeder oriented to deliver the major ingredient to the central feeder, wherein the quantity of the major ingredient delivered to the central feeder is greater than any other ingredient of the blend mixture;

(g) at least one secondary feeder oriented to deliver at least one minor ingredient to the central feeder, wherein the quantity of each minor ingredient delivered to the central feeder is less than the quantity of the lead ingredient delivered to the central feeder;

(h) a plurality of feeder regulators remotely controlled via a digital electronic system, wherein a central regulator controls the rate of delivery of the ingredients from the central feeder into the blender at a delivery rate that will maintain the level of material contained in the blender below a predetermined high and above a predetermined low, a lead regulator controls the rate of delivery of the major ingredient from the lead feeder to the central feeder, and one secondary regulator for each secondary feeder that controls the rate of delivery of each minor ingredient from its associated secondary feeder to the central feeder; and (j) a control system in communication with the blender monitoring device and the feeder regulators, the control system is configured to dynamically regulate the feeder regulators to adjust the delivery rate of the blend mixture discharged from the central feeder into the blender whenever the level of material contained in the blender charges to a value that is either greater than a predetermined high or below a predetermined low.

9. The blending system of claim 8, wherein the blender monitoring device is positioned directly over the blender.

10. The blending system of claim 8, wherein the blender monitoring device is a sonic, radar optical, inductive, or mechanical level monitoring device.

11. The blending system of claim 8, wherein the central, lead and secondary feeders are shuttle conveyors.

12. The blending system of claim 11, wherein the feeder regulators are variable frequency drives in communication with a set of motors that run the central, lead, and secondary feeders.

13. The blending system of claim 12, wherein the control system calculates a desired belt rate for each secondary feeder based on the real time belt speed of the lead ingredient feeder and a gear ratio between the lead ingredient feeder and the secondary feeder to provide a calculated amount of each ingredient in the blend mixture onto the central feeder.

14. The blending system of claim 13, wherein the control system is configure to calculate a remote set point for each variable frequency drive in communication with the set of motors that run the central, lead, and secondary feeders based on the choke gate opening of its container and a desired blend ratio in decimals of each ingredient.

15. The blending system of claim 14, wherein the control system dynamically evaluates the level, mass or amount of each ingredient within its designated container.

16. The blending system of claim 15, wherein whenever the level, mass or amount of one ingredient falls outside of its predetermined limits the control system alters the speed of the shuttle conveyor to alter the rate of delivery of the ingredient from its designated container to the central feeder.

17. The blending system of claim 8, wherein the blender monitoring device is a level sensing laser, a guided wave radar, a non-contact radar, or a pulsed radar level monitoring device.

18. The blending system of claim 8, wherein each storage container is equipped with a vent on a top side of the container and a dust filtration unit that removes dust from the vented air.

19. The blending system of claim 8, wherein at least one container is a different size or shape from the other containers.

20. A blending system comprising:
(a) a blender that blends at least two ingredients into a blend mixture;
(b) a blender level monitor positioned to dynamically monitor a level of the blend mixture contained in the blender;
(c) a plurality of storage containers each container vertically positioned on a flat ground surface platform on a set of legs and a discharge exit port positioned on a lower end of the container towards the platform among the legs, wherein at least one storage container contains each ingredient of the blend mixture;
(d) a container level monitor associated with each storage container that dynamically monitors a level, mass, or amount of material contained in the storage container;
(e) an adjustable discharge control device mounted on each storage container among the legs between the discharge exit port and the platform, wherein a discharge setting for the discharge control device governs a discharge rate of the ingredient from the storage container;
(f) an adjustable central feeder oriented such that it delivers the ingredients of the blend mixture into the blender by gravity;
(g) an adjustable lead ingredient feeder oriented to deliver a major ingredient to the central feeder, wherein the quantity of the major ingredient delivered to the central feeder is greater than any other ingredient of the blend mixture;
(h) at least one adjustable secondary feeder oriented to deliver at least one minor ingredient to the central feeder, wherein the quantity of each minor ingredient delivered to the central feeder is less than the quantity of the lead ingredient delivered to the central feeder;
(i) a central regulator that adjusts a delivery rate of the blend mixture from the central feeder into the blender;
(j) a lead regulator that adjusts a delivery rate of the major ingredient from the lead feeder to the central feeder; and
(k) one secondary regulator for each secondary feeder that adjusts a delivery rate of each minor ingredient from its associated secondary feeder to the central feeder;
(j) a control system in communication with the blender monitor, the storage container monitors, the central regulator, the lead regulator, and each secondary regulator, whereby whenever the level of the blend mixture within the blender is above a predetermined high or below a predetermined low the control system calculates an appropriate the rate of delivery of the blend mixture from the central feeder into the blender and instructs the central regulator to adjust the entry rate of the blend mixture from the central feeder into the blender, and to adjust the delivery rate for each ingredient onto the central feeder based on a desired blend ratio of each ingredient.

\* \* \* \* \*